June 14, 1927.

C. A. CAMPBELL 1,632,756

TRIPLE VALVE

Filed May 27, 1926

Inventor
Charles A. Campbell

By

Attorneys

June 14, 1927.

C. A. CAMPBELL 1,632,756

TRIPLE VALVE

Filed May 27, 1926

Inventor
Charles A. Campbell

By Dodge and Sons

Attorneys

June 14, 1927.

C. A. CAMPBELL 1,632,756

TRIPLE VALVE

Filed May 27, 1926       9 Sheets-Sheet 9

Inventor
Charles A. Campbell by Dodge and Sons
Attorneys

Patented June 14, 1927.

1,632,756

UNITED STATES PATENT OFFICE.

CHARLES A. CAMPBELL, OF WATERTOWN, NEW YORK, ASSIGNOR TO THE NEW YORK AIR BRAKE COMPANY, A CORPORATION OF NEW JERSEY.

TRIPLE VALVE.

Application filed May 27, 1926. Serial No. 112,109.

This invention relates to triple valves and particularly to triple valves for use on long trains such as freight trains.

It is well known that the K—2 triple, which embodies characteristics known in the art as quick serial action in service, restricted recharge and restricted release, does not adequately meet the requirements of service where extremely long trains are encountered as at present. On such trains the restricted recharge does not entirely prevent overcharge of auxiliary reservoirs at the forward end of the train, and such overcharge of course results in re-application when the engineer moves his brake valve from full release to running position. This tendency to re-application is affected unfavorably by the action of the quick service vent, the effect of the vent being to intensify the re-application and increase the number of cars upon which it occurs.

In a prior application, of Minnier and Campbell, Serial No. 27,472, filed May 2, 1925, there is described and claimed a method of controlling the action of automatic air brake systems including triple valves, and a triple valve operating according to said method. The present application relates to certain features described but not now claimed in said prior application and to additions to and improvements upon the triple valve of the prior application.

In order that the principles underlying the operation of the improved triple valve may be readily understood and in order that the relation of the present application to the prior application aforesaid may be made clear, an outline in general terms of the more important characteristic functions of the present valve will now be given.

The main mechanism of the valve includes as usual a triple valve, a graduating valve movable relatively thereto, and a triple piston with graduating stem, the piston controlling the charge to the auxiliary reservoir and also actuating the slide valve and its graduating valve. There are also auxiliary valve mechanisms controlled by corresponding pistons which perform the emergency application functions and the local venting of the brake pipe in service, as well as a number of other special functions which can be understood better after a general statement of the operative characteristics.

The valve mechanism as a whole is characterized by restricted recharge which is brought about in the usual manner, namely, by having the triple piston over-travel against spring resistance and throttle the feeding flow from the brake pipe to the auxiliary reservoir. The effects of restricted recharge are, as usual, to increase the speed of propagation of the releasing pressure wave throughout the length of the brake pipe and to reduce the tendency to overcharge at the forward end of the train.

Restricted recharge is accompanied by restricted release. This, as usual, is brought about through the overtravel of the slide valve in such a manner as to choke the exhaust port and thus retard the out-flow of air from the brake cylinder. The effect is to delay the release of brakes on the forward cars until the brakes on the rear cars shall have released.

The valve mechanism includes a quick serial service mechanism which conforms in its underlying principle to that described and claimed in the prior application. The service vent is under the control of an equalizing piston and valve called the quick service valve, somewhat similar in structure to the equalizing discharge valve used in the standard engineer's brake valve. The equalizing piston of the quick service valve is subject to brake pipe pressure acting in an opening direction and to pressure admitted from an equalizing chamber in a closing direction. The equalizing chamber is charged during release from the auxiliary reservoir. When the triple valve starts toward service position it places the equalizing chamber which is already in communication with the space above the equalizing piston into communication with a fixed volume known as the reduction chamber. Under normal conditions the reduction chamber is at atmospheric pressure and the relation of its volume to the volume of the equalizing chamber is such that the pressures in the two chambers equalize at a chosen pressure, for example about 7 pounds below the normal equalizing chamber pressure (i. e., normal brake pipe pressure). Consequently the quick service valve opens and then automatically closes when a 7 pound reduction of brake pipe pressure has been made.

As has just been stated, the reduction chamber is at atmospheric pressure under normal conditions, that is, after normal release. The triple valve is so contrived that during retarded release the reduction chamber is cut off from the atmosphere and is slowly charged to auxiliary reservoir pressure. Consequently the drop in pressure in the equalizing chamber, when it is connected to the reduction chamber immediately after retarded release, will vary inversely with the duration of retarded release. Thus the equalizing quick service valve will open for a short time or may not open at all in an application quickly following retarded release. This function is useful because in case of re-application occasioned by overcharged auxiliary reservoirs the quick service valves will not open and increase the re-application tendency.

When the triple valve moves to normal release position after retarded release, the reduction chamber is slowly bled down to atmospheric pressure so that by the time the over-charge of the reservoir has been dissipated, the reduction chamber will be at atmospheric pressure and the quick service valve will be ready to accelerate service applications by opening until a 7 pound reduction of brake pipe pressure has occurred.

The outlet to the atmosphere from the quick service valve is also controlled by a closing valve called the quick service check whose action is dominated by the movements of the main slide valve. When the reduction in the brake pipe pressure becomes too severe, the main slide valve moves to a position in which air is exhausted from above the quick service check piston and the check is allowed to close regardless of the position of the quick service valve. The effect is to prevent undesired emergency applications and this action is local as to every triple valve. Hence the action may take place in one part of the train and not in another.

The emergency mechanism is such that the operation of the emergency controlling valve is not under the control of the triple slide valve. Instead, the emergency controlling valve is controlled exclusively by the rate of reduction of brake pipe pressure. The emergency controlling valve is actuated by a piston which is subject to brake pipe pressure on one side and to pressure in the chamber called the emergency control chamber on the other side. There is also a closely related emergency actuating chamber which in emergency applications furnishes pressure to actuate the emergency actuation piston and related mechanisms. During service reduction the emergency control chamber and the emergency actuation chamber are conjointly vented at a restricted rate into the brake cylinder and the rate of venting corresponds to the proper rate of brake pipe reduction for service applications. So long as brake pipe pressure is reduced at the proper service rate, the emergency controlling valve assumes a neutral position, in which it is ready to produce an emergency application if the brake pipe pressure be reduced faster than the normal service rate.

Means are provided which function when the auxiliary reservoir pressure has been reduced to within a stated differential, say 5 pounds from brake cylinder pressure, to by-pass the air flowing from the emergency control chamber and the emergency application chamber, and deliver it to the brake pipe instead of to the brake cylinder. The size of the port through which the flow is by-passed is so proportioned that the back flow from these two chambers passes to the brake pipe at a service rate without any movement of the emergency control valve. If this rate be exceeded for any cause, an emergency application will be produced. The effect of this construction is to conserve the operating fluid by discharging it into the brake cylinder so far as possible.

Emergency applications occur, in the operation of the present application, in three stages. In the first stage brake pipe air passes to the brake cylinder until a brake cylinder pressure of 15 pounds (more or less) is reached. During the flow of brake pipe air to the brake cylinder the flow of auxiliary reservoir air to the brake cylinder is throttled or entirely stopped by a cut out valve. A bleed port determines how long the flow of auxiliary reservoir air shall remain throttled or cut off, but a period of seven seconds is ordinarily appropriate. In the second stage of emergency applications, air from the auxiliary reservoir flows freely to the brake cylinder.

An emergency reservoir distinct from the auxiliary reservoir is used and this not only furnishes air for the third emergency stage, but is availed of to secure several highly desirable secondary results. When the pressure in the brake cylinder has risen to within, say 5 pounds of auxiliary reservoir pressure (the exact time of action is determined by design), a so-called change-over piston shifts and admits air from the emergency reservoir to the brake cylinder.

The general effect of this type of emergency actuation in which pressure is admitted from three different sources in three different steps is to build up emergency pressures gradually and allow the slack to bunch. Nevertheless, the emergency application is propagated throughout the length of the train with the utmost rapidity and the brakes are applied with full pressure even when the emergency application follows a full service application, because the air in the emergency reservoir is retained in service applications, and its pressure equalizes only with the brake cylinder volume.

The purpose of limiting the admission of brake pipe air to the brake cylinder to 15 pounds is to ensure the admission of only sufficient air to the cylinder to bunch the slack without undue shock. Complete equalization of the brake pipe with brake cylinder would give a brake cylinder pressure of about 32 pounds per square inch, and this is high enough to cause an injuriously severe run-in of slack. By admitting air up to 15 pounds brake cylinder pressure and then venting the remaining brake pipe air to atmosphere smooth braking and rapid brake pipe venting are both secured.

In the emergency function brake pipe air is fed to the brake cylinder only while brake cylinder pressure is below 15 pounds and above that brake cylinder pressure, brake pipe air is vented directly to the atmosphere. Consequently, if a service application has produced a pressure of 15 pounds in the brake cylinder, and brake pipe pressure is thereafter suddenly reduced to bring about an emergency application, the brake pipe will be initially vented to the atmosphere and the emergency pressure-drop will be rapidly propagated throughout the brake pipe.

A prime advantage of the emergency reservoir is that the pressure fluid in this reservoir is never drawn on in service applications. Consequently, it is always available for emergency. This available store of air is further safeguarded by the fact that it is not admitted to the brake cylinder until after the flow of auxiliary reservoir air is virtually completed. In this way the brake cylinder is brought to the highest pressure possible by means of brake pipe air and auxiliary reservoir air. The emergency reservoir is then allowed to equalize with the brake cylinder volume only, flow of pressure fluid from the emergency reservoir and brake cylinder to the auxiliary reservoir being prevented by a check valve. This is an important point as it allows the use of an emergency reservoir of much smaller volume and yet ensures a high emergency brake cylinder pressure.

The emergency reservoir is charged from the auxiliary reservoir through the main slide valve in normal release position and not in retarded release position. Consequently direct over-charging of the emergency reservoir is not possible in restricted recharge position. Nevertheless if the auxiliary reservoir became overcharged, it would overcharge the emergency reservoir when the triple valve moved back to normal release and recharge position. To counteract this possibility the valve is so contrived that when the triple slide valve moves to restricted recharge position, it bleeds the emergency reservoir to atmosphere through a port of such size that pressure in the emergency reservoir will be reduced by a small amount, ordinarily about 10 pounds.

In case of restricted recharge and release the auxiliary reservoir may and probably will be overcharged, but at the same time the emergency reservoir will be bled down to sub-normal pressure. When the triple valve moves back to normal release position, the pressure in the emergency and auxiliary reservoirs equalizes through the emergency reservoir feed port in the slide valve, restoring the emergency reservoir charge and at the same time relieving some or all of the overcharge in the auxiliary reservoir. This minimizes the tendency for re-application to occur when the engineer moves his valve to running position.

The arrangement just described has another beneficial effect. Suppose an emergency application be made immediately after release. Immediately after release the auxiliary reservoirs on cars at the front of the train are likely to be overcharged or at any rate charged more heavily than those at the rear of the train. Conversely, the emergency reservoirs at the front end of the train will have been bled down more or less and the effect is to produce approximately the same final emergency pressure in the brake cylinders throughout the entire length of the train.

The construction is such that the emergency reservoir equalizes rapidly with the brake cylinder in emergency applications. It is possible to get various braking pressures by the use of emergency reservoirs of different sizes.

Except for the small amount of air discharged from the emergency reservoirs during restricted release, and this as a rule occurs only on a few cars of the train, the device is quite economical of air. For example during service application graduations the air from the emergency actuation chamber and from the emergency control chamber is fed to the brake cylinder and this action continues almost until equalization occurs between brake cylinder and auxiliary reservoir.

The emergency controlling valve is so arranged that it must move quickly to the release position if the triple valve moves to release and recharge position. The ports are so contrived in this present valve that when the triple slide valve is in release and recharge position and the vent valve is in emergency position, the air in the emergency control chamber is vented to atmosphere. As soon as this occurs, brake pipe pressure, acting on the emergency control piston, heavily predominates and restores the emergency control piston.

In the accompanying drawings there is illustrated a practical embodiment of the invention. These drawings are in diagram and are designed to make all the ports and passages appear in the same plane so that their simultaneous functions may be observed. This requires some distortion of proportions, for obviously the parts can be more compactly arranged if desired. The drawings, however, show all the parts and their operative relations, and permit the functions of the various parts and the inter-relations of such functions to be readily traced.

In the drawings,

Fig. 1 is a longitudinal diagrammatic section of the complete triple valve, including certain special chambers characteristic of the invention. The auxiliary reservoir, the emergency reservoir, the brake cylinder and the brake pipe are not illustrated since their forms do not differ from standard practise. Their points of connection are, however, illustrated. In Fig. 1 the parts are shown in normal charging and release position.

Fig. 9 is an enlarged fragmentary view of the triple slide valve and its graduating valve in the position of Fig. 1.

Fig. 10 is an enlarged fragmentary view showing the emergency control valve and its riding valve in the position of Fig. 1.

Fig. 11 is an enlarged fragmentary view showing the change-over valve in the position of Fig. 1.

Fig. 12 is an enlarged view of the emergency actuation piston in section, showing the timing or bleed port formed therein.

Figure 1:
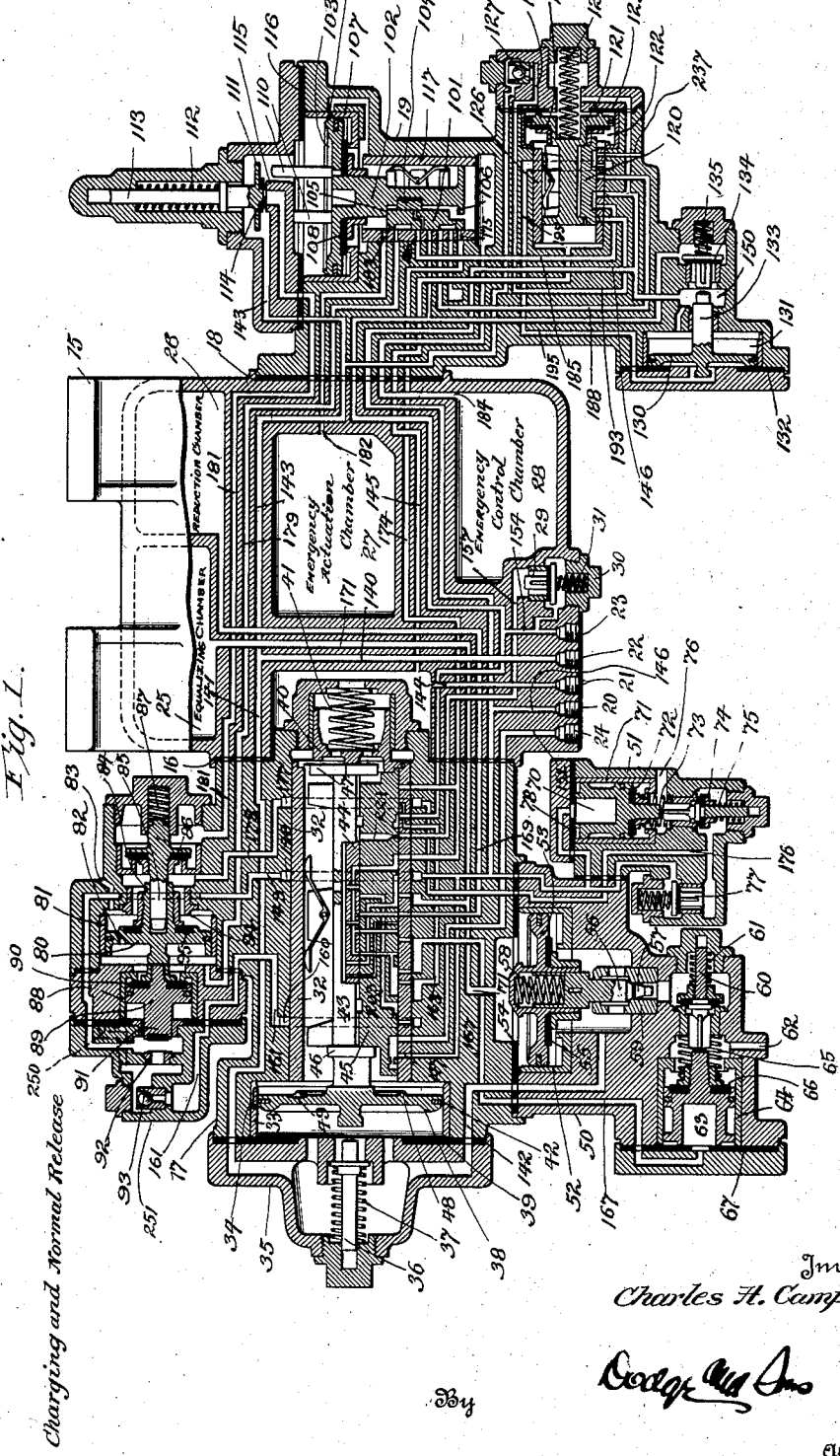

The valve as a whole is supported upon a bracket structure 15 which is formed with a plurality of chambers hereinafter described and a plurality of ports communicating with the various chambers, or with parts of the valve mechanism. The bracket structure proper contains no moving parts other than a check valve and to this bracket structure all pipe connections are made. The bracket is formed with a plurality of ported faces to which correspondingly ported bodies of the various valve mechanisms are bolted. The face 16 receives the body of the triple valve, indicated generally by the numeral 17. The face 18 receives the body of the emergency control valve, indicated generally by the numeral 19. The brake cylinder is connected at 20, the auxiliary reservoir at 21, the brake pipe at 22, and the emergency reservoir at 23. 24 is a connection for an exhaust pipe which according to usual practice would lead to a retaining valve of any suitable form.

There are a number of ports extending continuously through the body 17 of the triple valve, the bracket structure 15 and the body 19 of the emergency valve, but these can better be defined after the mechanical parts of the various valve mechanisms have been set forth.

The bracket 15 contains an equalizing chamber 25 which in release and recharge position (both normal and restricted) is charged to the same pressure as the auxiliary reservoir. The bracket 15 also contains a smaller chamber 26 known as the reduction chamber. In full release this chamber is connected through a restricted port with the atmosphere and hence gradually assumes atmospheric pressure. In restricted release and recharge this chamber 26 is charged through a small port to the same pressure as the auxiliary reservoir. These two chambers conjointly control the quick service piston or equalizing piston which determines the action or inaction of the brake pipe vent.

The bracket 15 contains a third chamber 27, known as the emergency actuation chamber. This is charged in the release positions with pressure fluid to the same pressure as the auxiliary reservoir and this pressure fluid acts under the control of the emergency control valve to shift the emergency actuation piston and the emergency build-up delay piston in emergency applications.

The bracket 15 contains a fourth chamber 28, known as the emergency control chamber. This chamber is charged in the release positions to the same pressure as the auxiliary reservoir and serves as the actuating pressure for the emergency control valve. In other words, the piston which actuates the emergency control valve is balanced between the pressure in the emergency control chamber and the pressure in the brake pipe. The parts are so contrived that when brake pipe pressure is reduced at a service rate, the emergency control valve shifts slightly and thereupon bleeds the chambers 27 and 28 conjointly at a rate commensurate with the proper rate of brake pipe pressure reduction for service application. The emergency control piston therefore remains in a balanced condition so long as brake pipe pressure is reduced at the proper rate. The air so vented from chambers 27 and 28 during service applications is passed to the brake cylinder, at least until equalization has been practically completed. In this way the charge in these two chambers is conserved by its application in the development of useful braking pressure.

The single moving part mounted in the bracket 15 is the check valve 29 covered by the threaded plug 30 and seated by the spring 31. This check valve is in the feed port through which the emergency reservoir is charged from the auxiliary reservoir. Its purpose is to prevent back-flow through the charging port from the emergency reservoir to the auxiliary reservoir.

The triple valve body 17 conforms generally to standard practice. The body has the usual valve chamber bushing 32, cylinder bushing 33, feed port 34, front cap 35, graduating stem 36, graduating spring 37, triple piston 38, gasket 39, piston retard stop 40, and retard spring 41. The triple piston 38 is provided with the usual packing ring 42. The rod 43 of the piston confines and positively moves the graduating valve 44 mounted in a recess formed in the rod 43 to receive it. It also shifts with certain lost motion between the rod and the valve the main triple slide valve 45, the valve 45 being engaged by two spaced lugs, 46, 47 formed on the rod 43.

The piston 38 has on its right hand face a rib or annular boss 48 which collides with the left hand end of the bushing 32. This rib is interrupted for a short distance at 49 to form a feed port through which the auxiliary reservoir is charged in restricted recharge position. In full release and recharge position the piston 38 stands slightly to the right of the port 34 and air flows through this port around the piston. If the piston be forced further to the right to restricted release and recharge position (Fig. 2), then the rib 48 seats against the end of the bushing 32, and the feed must pass through the groove 49. This produces a restricted recharge which occurs at the front end of the train as an incident to a heavy releasing pressure wave in the brake pipe. The movement from full release to restricted release position is made against the opposition of the retard spring 41, which restores the parts to full release position when it is not overpowered by the preponderance of brake pipe pressure over auxiliary reservoir pressure.

The above will be recognized as a familiar type of restricted recharge mechanism.

Mounted on the lower side of the triple valve body 17 is a structure made up of a main or quick service valve section 50 and an emergency by-pass section 51. Formed in the quick service portion 50 and lined with the usual cylinder bushing 52 is the quick service cylinder in which works a graduating piston 53 which is provided with the usual packing ring and which in its upper position seats on a gasket 54 and in its lowermost position seals by means of the gasket 55 against a flange on bushing 52.

The piston 53 carries an equalizing discharge valve member 56 whose pilot 57 is similar to those used in equalizing discharge valves characteristic of standard types of engineer's brake valve. The valve member 56 is not rigidly connected to the piston 53, but is capable of limited axial sliding motion relatively thereto and is urged downward by a spring 58. The purpose of this is to allow the gasket 55 to seal and yet ensure tight seating of the valve 56 on its seat 59. The piston 53 is subject on its lower side to brake pipe pressure. The space above the piston is at times connected simultaneously to the equalizing chamber 25 and reduction chamber 26, as will hereinafter be explained.

The valve 56 when seated on its seat 59 controls a port leading to the quick service exhaust check 60. This is normally held seated by a spring 61 and thus closes the passage to an exhaust port 62 leading to the atmosphere. Through this port 62 the brake pipe is vented during service applications and to permit such venting a quick action vent piston 63 mounted in a cylinder bushing 64 in the body portion 50 is provided. In its left hand position the piston 63 seats against the gasket 67. This piston is at times forced to the right against the action of a spring 65 and when so forced to the right, seals by means of a gasket 66 against a flange on the end of bushing 64. The quick service exhaust piston 63 at such time strikes the quick service exhaust check valve 60 and unseats this check valve.

While the quick service valve 56 controls the quick service vent during the start-to-service and quick service, it may occasionally be unseated during recharge. The quick service exhaust check 60 and the quick service exhaust piston 63 are provided as a secondary control, the quick action vent piston 63 being actuated by the triple slide valve to open the vent 62 only when quick service venting is desired.

The emergency by-pass section 51, which is adjacent the quick service valve mechanism, is designed to act in the first stage of emergency and after brake cylinder pressure has reached a chosen value, or if at the commencement of emergency it shall have reached such chosen value. This valve, under such conditions, diverts the brake pipe ventflow so that instead of passing to the brake cylinder it passes to atmosphere. The mechanism includes a piston 70 in cylinder bushing 71. In its upper position the piston 70 seals against the gasket 78. The piston 70 has a gasket 72 which seals against a flange on bushing 71 when the piston is forced to its lowermost position against the action of the spring 73. The stem of the piston 70 then displaces the emergency by-pass check valve 74 which is normally held seated by a spring 75, and permits the flow of air to the atmosphere through the exhaust port 76. A check valve 77 is used to prevent backflow from the brake cylinder to the atmosphere when valve 74 is open. In the first part of the first stage of emergency, air flows from the brake pipe to the brake cylinder, lifting the check 77. When brake cylinder pressure rises to a stated value, assumed to be about 15 pounds, piston 70 is moved down against the action of the spring 73 and unseats the emergency by-pass check 74. From then on the brake pipe is vented to atmosphere through the port 76, and check 77 closes.

The emergency actuation device and the emergency build-up delay valve are mounted above the triple valve portion, the body of the mechanism being cast as a part of the triple valve body 17. The emergency actuating piston 80 works in a bushing 81 and is provided with a minute bleed port 82 through which pressure fluid is bled through the piston from left to right. (See Fig. 12.) The space at the right of the piston is connected to atmosphere by a port 83. The piston 80 is formed with a tubular stem extension 84 which telescopes over the stem 85 of the brake pipe check 86 which is normally held closed by a spring 87 and which, as will be further explained, prevents, in its normal closed position, passage of brake pipe air to the brake cylinder.

The space to the left of the emergency actuating piston 80 communicates with a second and smaller cylinder formed by the cylinder bushing 88. In this there works a piston 89 having a gasket 90 on its right hand face. This gasket 90 in the right hand position of the piston 89 seats on a flange on the cylinder bushing 88 and produces a sealed joint.

The build-up delay valve 91 is carried on a stem or projection extending to the left from the piston 89 and arranged to seat on the annular seat member 92. The valve member 91 and the seat member 92 conjointly control the flow from the auxiliary reservoir to the brake cylinder. A check valve 93, known as the service port check, prevents backflow, but opens freely in the direction of flow from the auxiliary reservoir to the brake cylinder. Between the emergency actuating piston 80 and brake pipe check 86 is a valve seat 94, against which a gasket 95 on the right face of piston 80 seats when the piston is fully to the right.

The emergency control valve, the change-over piston with its valve, and the emergency reservoir by-pass check are all mounted in the body member 19. The emergency control valve 101 is moved on a seat formed in valve bushing 117 by stem 102 of the emergency control piston 103. This stem 102 directly engages and positively moves a small graduating valve 104 which rides on the emergency control valve 101, while the latter valve (101) is also moved by the stem 102, but with limited lost motion relatively thereto, by means of spaced shoulders 105 and 106.

Piston 103 works in a cylinder bushing 107 and has a gasket 108 which seats on a flange formed on the bushing when the piston is in its lowermost position. Bushing 107 is provided with a charging port 109 which is opened when the piston is in its lowermost position. The piston carries three projecting lugs 110 two of which are visible in the drawings in position to strike and open the brake pipe emergency check valve 111 which opens upward and is normally held in its lower position by a coiled spring 112, surrounding its stem 113.

Valve 111 is formed with a gasket 114 which seats on a valve seat formed on the end of a tubular extension 115. The port in the member 115 is the passage through which brake pipe air flows to the brake cylinder in emergency. In its uppermost position piston 103 seals against gasket 116.

The emergency change-over valve 120 slides in a seat in valve chamber bushing 126 and is actuated by a piston 121 which works in a cylinder bushing 122. In its right hand position the piston seals against the gasket 123. The piston 121 carries a gasket 124 on its left hand side which in its left hand position seals against a flange on the cylinder bushing 122. A spring 125 gives the piston a bias in the left hand direction. Associated with this valve is the brake pipe passage check 127, for a purpose later to be described.

The emergency control valve 101, as has been explained, operates in service reductions to bleed the emergency actuation chamber 27 and the emergency control chamber 28 into the brake cylinder during service applications. In an emergency application the piston 103 moves upward to the limit of its motion and the lugs 110 force the brake pipe emergency check 111 open. This initiates the emergency application, the first stage of which is terminated when the pressure between the pistons 80 and 89 bleeds away through port 82.

The change-over piston 121, with its valve 120, shifts at the end of the second stage to cause the emergency reservoir by-pass piston to function and admit emergency reservoir air to the brake cylinder, this being the commencement of the third stage of emergency.

The emergency reservoir by-pass piston is shown at 130. It works in a cylinder bushing 131 and in its left hand position seals against a gasket 132. The stem 133 of the piston 130 is alined with the pilot of the emergency reservoir by-pass check 134 which is normally held closed by the spring 135. When the piston 130 moves to the right, the stem 133 unseats the valve 134.

The moving parts of the valve mechanism having been described generally as to their mechanical structure, the porting of the body can be explained. After describing the connecting ports in the body portions of the mechanism it will be possible to describe and explain the porting of the various moving valve elements.

Leading from the brake pipe connection 22 is a passage 140 which has a branch 141 leading to the space within the front cap 35 at the left of the main triple piston 38. An extension 142 of this passage 141 leads from the space within the cap 35 to the space beneath the piston 53. Consequently the passages 140 and 141 provide the connection through which charges of brake pipe pressure are communicated to the triple piston 38 to actuate the same, while these two passages with the extension port 142 offer the passage through which the brake pipe is vented to atmosphere in service applications. As already explained, when the valve 56 opens air flows from the space below piston 53 through the valve seat 59 past check 60 and through the quick service exhaust port 62.

Leading from the passage 140 is a branch passage 143. This has two branches, one of which leads to the space above the emergency control piston 103, and the other of which leads to the space above the check valve 127. From the space within the valve bushing 32 at the right of piston 38 there leads a passage 144 which communicates with the auxiliary reservoir connection 21. A second passage 145 also leads from the space within the bushing 32 at the right of the piston 38 and extends to the space within the change-over valve bushing 126 to the left of the change-over piston 121.

From the brake cylinder connection 20 there leads a passage 146 which has various branches. One branch leads to a port 147 in the seat on which the main triple slide valve 45 slides. Another leads to the space above the piston 70. Another leads to the space above the check valve 77. Still another leads by way of the groove 148 around the outside of the bushing 32 and thence to a passage 149 to the space at the right of the emergency build-up delay valve seat 92. Another branch of the passage 146 leads to the body 19 of the emergency control valve where it has three branches. One of these leads to the space 150 at the left of the emergency reservoir by-pass check 135. Another leads to a port 151 in the seat of the change-over valve 120, while the third leads to the space at the right of the change-over valve piston 121. From the exhaust connection 24 a passage 152 leads to a port 153 in the seat of the main slide valve 45.

From the emergency reservoir connection 23 there leads a passage 154 which is branched. One such branch leads to a port 155 in the seat of the main slide valve 45. Another branch leads to the space below the emergency reservoir charging check valve 29. A third branch leads to the space to the right of the emergency by-pass check valve 134. Another branch leads to a port 156 in the seat of the emergency control valve 101.

The space above the emergency reservoir charging check 29 is connected by a passsage 157 with the emergency reservoir charging port 158 in the seat of the main triple slide valve 45. Port 159 in the seat of the triple slide valve 45 has a communication 160 leading around the valve chamber bushing 32 to a passage 161 which leads to the space below the service port check valve 93. As will be readily understood, the space above the check valve 93 is in direct communication with the port in seat 92 of the emergency build-up delay valve 91.

There is an exhaust port 162 in the seat of the triple slide valve 45 and this is connected by a branch passage 163 with a smaller port 164 remote from port 162 and also formed in the seat of triple slide valve 45. Two ports, 165 and 166, are conjointly connected by a passage 167 with the space to the left of the quick action vent piston 63. A port 168 in the seat of the triple slide valve 45 is connected by a passage 169 with the reduction chamber 26 and is the port through which this chamber is charged during restricted release.

Port 170 in the seat of the triple slide valve 45 is connected by a passage 171 with the space above the piston 53 and also with the equalizing chamber 25. Two ports 172 and 173, spaced apart in the slide valve seat, are both connected by a passage 174 with the port 175 in the seat of the emergency control valve 101. The space below the check valve 77 and below the check valve 74 is connected by a passage 176 to a passage 177 which is formed in the body 17 around the valve chamber bushing 32 and communicates with a passage 178 leading to the space between the brake pipe check 86 and the valve seat 94 with which the emergency actuating piston 80 coacts. The space to the left of the piston 80 is connected by a passage 179 with the port 180 in the seat of emergency control valve 101. The space to the right of the brake pipe check valve 86 is connected by a passage 181 leading to the tubular extension 115 with whose end the brake pipe emergency check coacts.

The passage 182 leads from the emergency actuation chamber to a port 183 in the seat of the emergency control valve 101. The passage 184 leads from the emergency control chamber 28 to the space within the valve bushing 117 below the piston 103. The passage 185 leads from a port 186 in the seat of emergency control chamber 101 to a port 187 in the seat of the change-over valve 120. The passage 188 leads from a port 189 in the seat of the emergency control valve 101 to a port 190 in the seat of the change-over valve 120. Port 191 in the seat of the emergency control valve 101 is connected directly to atmosphere. The port 192 in the seat of the change-over valve 120 is connected by a passage 193 with the space below the check valve 127. A port 194 is connected by a passage 195 with the space to the left of the piston 130.

The triple slide valve 45 is ported as follows: There is in the lower face a cavity 200 connected to a second cavity 201 by a constricted passage 202. These cavities coact with the ports 147 and 153 to produce full and restricted release. Full release occurs from 147 to 153 through the cavity 200. When the valve moves to the right to restricted release position, the exhaust from 147 to 153 must pass through the constricted passage 202. The port 203 leads from the bottom face of the slide valve 45 to the top face where it is controlled by the graduating valve 44. On the lower face communicating with the port 203 there is an enlarged cavity 204 which coacts with the port 159 leading to the brake cylinder and registers therewith in service and emergency positions. The port 205 in the graduating valve 44 registers with the upper end of the port 203 in service and emergency positions, and moves out of register therewith in lap position. This is the main feed port from the auxiliary reservoir to the brake cylinder.

There is a cavity 206 in the lower face of the slide valve 45 which serves in full and retarded release positions to connect the ports 165 and 162, and thus connect the space to the left of the quick action vent piston to atmosphere. Communicating with the port 206 is a port 207 which leads from the bottom face of the valve 45 to the top face thereof. There is also a port 208 extending from the bottom to the top of the valve 45 and having on the lower face an enlarged cavity 209 which in both release positions registers with the port 172.

A connecting port 210 in the graduating valve 44 connects the ports 207 and 208 when the graduating valve is in its right hand position, as it is in release. If the triple slide valve 45 and its graduating valve 44 move to either full or restricted release position after an emergency application and the emergency control piston 103 tends to remain in emergency position, then the space below the emergency piston 103 will be bled to atmosphere through the ports 175, 174, 172, 209, 208, 210, 207, 206 and 162. In emergency position the lower end of the port 207 registers with the port 165, while the port 206 registers with the exhaust port 162. Consequently in emergency the space to the left of the quick action vent piston 63 is vented to atmosphere and the quick service exhaust check 60 remains closed.

There is a port 211 extending from the bottom to the top face of the slide valve 45. During quick service venting the port 211 registers with port 166 and a port 212 in the graduating valve registers with the port 211, thus admitting auxiliary reservoir air to act against the left side of the quick action vent piston 63. Piston 63 is thus forced to the right, opening the quick service exhaust check 60. During service-lap port 211 registers with a branch 213 of the port 210 in the graduating valve and thus vents the quick action piston 63, ensuring the termination of local service venting.

There is a port 214 leading from the top to the bottom face of the triple slide valve 45. With this a port 215 in the graduating valve 44 registers in both release positions and in lap position. Port 214 registers in restricted release with port 168 through which the reduction chamber is charged. Ports 214 and 215 are relatively small so that the charge occurs at a slow rate. These ports function only in restricted release position.

The port 216 leads from the top of the slide valve 45 to a cavity 217 on the lower face thereof. This cavity during quick service venting connects the equalizing and reduction chambers by connecting the ports 168 and 170. A port 218 in the graduating valve 44 registers with the upper end of the port 216 in both full and restricted release positions. The ports 218 and 216 therefore offer passage through which the equalizing chamber is charged. The ports also register during service lap and permit equalization of auxiliary reservoir pressure with the equalizing chamber and reduction chamber pressures, these chambers at such times being connected together.

The port 219 extends between the top and bottom of the triple slide valve 45. In full release position it registers with port 168 which is connected with the reduction chamber 26. It also registers in this position with a restricted port 220 in the graduating valve 44. Consequently in full release position the reduction chamber is bled to atmosphere by way of ports 168, 219, 220, 210, 207, 206 and 162.

A port 221 extends from the top to the bottom of the slide valve 45. It is not controlled by the graduating valve 44 and it registers in full release position only with the port 158 which is the port leading to the upper side of the emergency reservoir charging check. Consequently the emergency reservoir is fed from the slide valve chamber during full release only.

It will be recalled that there is a second port 155 connected with the emergency reservoir and not dominated by the emergency reservoir charging check 29. Adjacent this is a port 164 which is connected with the exhaust port 162. A small cavity 222 in the lower face of the triple slide valve 45 bridges the ports 155 and 164 in restricted release position only. The size of the ports is so chosen that while the valve remains in restricted release position emergency reservoir pressure will be bled down a moderate amount, preferably about 10 pounds.

As already explained, when the valve returns to full release position and port 221 again registers with port 158, the emergency reservoir will draw on the supply of air in the auxiliary reservoir and thus tend to neutralize whatever over-charge may be present.

The emergency control valve 101 is so arranged that in both release positions and in quick service, full service and service lap positions it stands below the port 183 so that the emergency actuation chamber is, in these positions, in communication with the chamber of the emergency control valve 101. This valve has on its face a cavity 230 which serves in emergency position (which for the valve 101 is the same for all three emergency stages) to connect the port 180 with the port 183, thus admitting emergency actuation chamber air to the space between the emergency actuating piston 80 and the emergency build-up delay piston 89.

In the valve 101 there is a through port 231 which is controlled by the graduating valve 104. In the release positions and in emergency position the port 231 is out of register with the port 186. In quick service, full service and lap positions the port 231 is in register with the port 186. In quick service position and full service position the graduating valve 104 clears the port 231, but laps it in lap position.

It follows from the above that in quick service and in full service air from the emergency actuation chamber and from the emergency control chamber is vented through the port 231. In quick service and in full service this air flows to the brake cylinder, but near the end of the service action or when the brake cylinder has been built up to within 5 pounds of auxiliary reservoir pressure the change-over piston 121 shifts and from then on the vented air flows to the brake pipe, as will be further disclosed with reference to Figure 11.

Valve 101 is provided with another cavity 232 which in all positions except emergency connects the ports 189 and 191, 191 being an exhaust port. This connection performs no function except in full service position after the change-over valve has shifted. At such time it vents the space to the left of the emergency reservoir by-pass piston 130. In emergency position the cavity 232 connects the ports 156 and 189. This performs no function in the first and second stages of emergency, but after the change-over valve has shifted, as it does to initiate the third stage of emergency, the connection between ports 156 and 189 permits emergency reservoir air to flow to the left side of the emergency reservoir by-pass piston 130 and shift this piston to the right.

The change-over valve 120 is provided with two cavities 235 and 236. When the by-pass piston is to the right, as it is at all times except when brake cylinder pressure builds up to within 5 pounds of auxiliary reservoir pressure and during the third stage of emergency, cavity 235 connects port 194 to atmospheric port 237, thus venting the space to the left of the emergency reservoir by-pass piston 130. When within 5 pounds of full equalization cavity 235 connects ports 190 and 194, establishing an alternative vent for the piston 130 through the coaction of cavity 232 in emergency control valve 101. In the third stage of emergency the cavity 235 connects the ports 190 and 194, as in the case of full equalization just described, but now the valve 101 is in emergency position and the cavity 232 functions to admit emergency reservoir air by way of the cavity 235 to act against the left hand side of the emergency reservoir by-pass piston 130.

Cavity 236 connects the brake cylinder port 151 with port 187 when the valve 120 is to the right and connects the brake pipe port 192 with the port 187 when the valve is to the left. It is to the right at all times except at the close of full equalization and in the final stage of emergency. The cavity 236 therefore functions during quick service to direct air from the emergency actuation chamber and emergency control chamber, discharged through port 186, to the brake cylinder. Toward the end of full equalization when auxiliary reservoir pressure has fallen to within about 5 pounds of brake cylinder pressure, the change-over piston shifts and the cavity 236 diverts the vented air from the brake cylinder to the brake pipe.

*Description of operation.*

*Charging and normal release, Fig. 1.—* Brake pipe air enters the triple valve bracket 15 at the connection 22 and flows through the passages 140 and 141 to the space within the front cap 35 at the left of the main piston 38, forcing this piston with the graduating valve 44 and the triple slide valve 45 to the right until the stem 43 is arrested by the retard stop 40. It is assumed that the rise of brake pipe pressure is gradual and that the retard spring 41 will not be overpowered by the piston 38. Air flows through the feed port 34 to the slide valve chamber within the bushing 32 and from this chamber the air flows through the port 144 to the auxiliary reservoir connection 21. In this way the auxiliary reservoir is charged to brake pipe pressure.

Air flows from the space within the bushing 32 through the port 218 in graduating valve 44 and port 216 in main valve 45 to the cavity 217 on the lower face of valve 45. Thence it flows by port 170 and passage 171 to the space above the equalizing piston 53 and to the equalizing chamber 25, charging these spaces to the auxiliary reservoir pressure. Air also passes through the port 221 in the slide valve 45 to the port 158 in bushing 32 and thence through the passage 157 to the emergency reservoir charging check 29. The check opens and the flow continues through port 154 to the emergency reservoir connection 23, thus charging the emergency reservoir to the same pressure as the auxiliary reservoir.

Air also passes through port 215 in the graduating valve 44 to port 214 in the slide valve 45, but is arrested at the slide valve seat. From the space within the front cap 35 air flows through the passage 142 to the chamber beneath the piston 53, but is prevented from further passage by valve 56 which is seated in its seat 59. If for any reason the rate of rise in the brake pipe should be sufficient to lift piston 53 and unseat valve 56, flow would be arrested by the check valve 60 which is held seated by its spring 61.

The brake cylinder is exhausted to atmosphere through a relatively large exhaust passage as follows: brake cylinder connection 20, passage 146, port 147, cavity 200, port 153, passage 152, exhaust connection 24. At the same time air is being exhausted from the space above the piston 70, thus allowing the spring 73 to force the piston upward until the check valve 74 is seated by the action of spring 75. At the same time air is exhausted from the passages 148 and 149, thus venting the space to the left of the piston 89 and the passage 161, 160 and the port 159.

The reduction chamber 26 is connected to atmosphere by passage 169, ports 168, 219, 220, 210, 207, 206 to the independent exhaust port 162. It will be observed that the small size of the port 220 causes this venting to take place at a relatively slow rate. Air is discharged from the space at the left of the quick service exhaust piston 63 by way of passage 167, port 165, cavity 206 and independent exhaust port 162. Passage 174, which leads to the seat of the emergency actuating slide valve 101, is open to the atmosphere through ports 172, 209, 208, 210, 207, 206 and independent exhaust port 162.

Brake pipe air also flows from the passage 140 to the passage 143 to the chamber above the emergency control piston 103. The brake pipe emergency check 111 is closed and prevents flow to the passage 115. As the pressure builds up, the piston 103 moves downward and seals by means of gasket 108. Brake pipe air then flows through the feed port 109 to the chamber within the emergency control valve bushing 117. The purpose of the gasket 108 is to ensure that the port 109 limits the rate of flow in charging.

Air flows by way of the port 183 and passage 182 to the emergency actuation chamber 27. Air also passes through the passage 184 to the emergency control chamber 28. As explained, the passage 143 has a branch extending to the space above the check valve 127, but flow is arrested by this check.

While the auxiliary reservoir is being charged, air flows to the right through the passage 145 to the valve chamber within the bushing 126. When the pressure within this valve chamber rises to a value determined by the strength of the spring 125 (assumed to be 5 pounds per square inch), the piston 121 is shifted to the right and seats against the gasket 123. The resulting movement of the slide valve 120 to the right exhausts air from the chamber at the left of the emergency reservoir by-pass piston 130 by way of passage 195, port 194, cavity 190, and port 237. At the same time port 192, which connects by passage 193 with the under side of check 127, is blanked and cavity 236 in the slide valve 120 connects the brake cylinder port 151 with port 187 which leads to port 186 in the seat of emergency control valve 101.

The emergency reservoir, connected at 23, is being charged through the passage 154. Air can also pass through this port to the space to the right of the check valve 134 which closes against flow. The passage 154 is also connected with the port 156 in the seat of the emergency control valve 101. This port is blanked by the valve 101 at this time. Remembering that the brake cylinder is exhausting in this position, it will be observed that the passage 146 vents the space 150 to the right of emergency reservoir by-pass piston 130 and also the space to the right of the change-over piston 121. Cavity 232 in the emergency control piston 101 connects the exhaust port 191 in its seat with the port 189 which connects by means of the passage 188 with the port 190 in the seat of change-over valve, 120.

Figure 2:
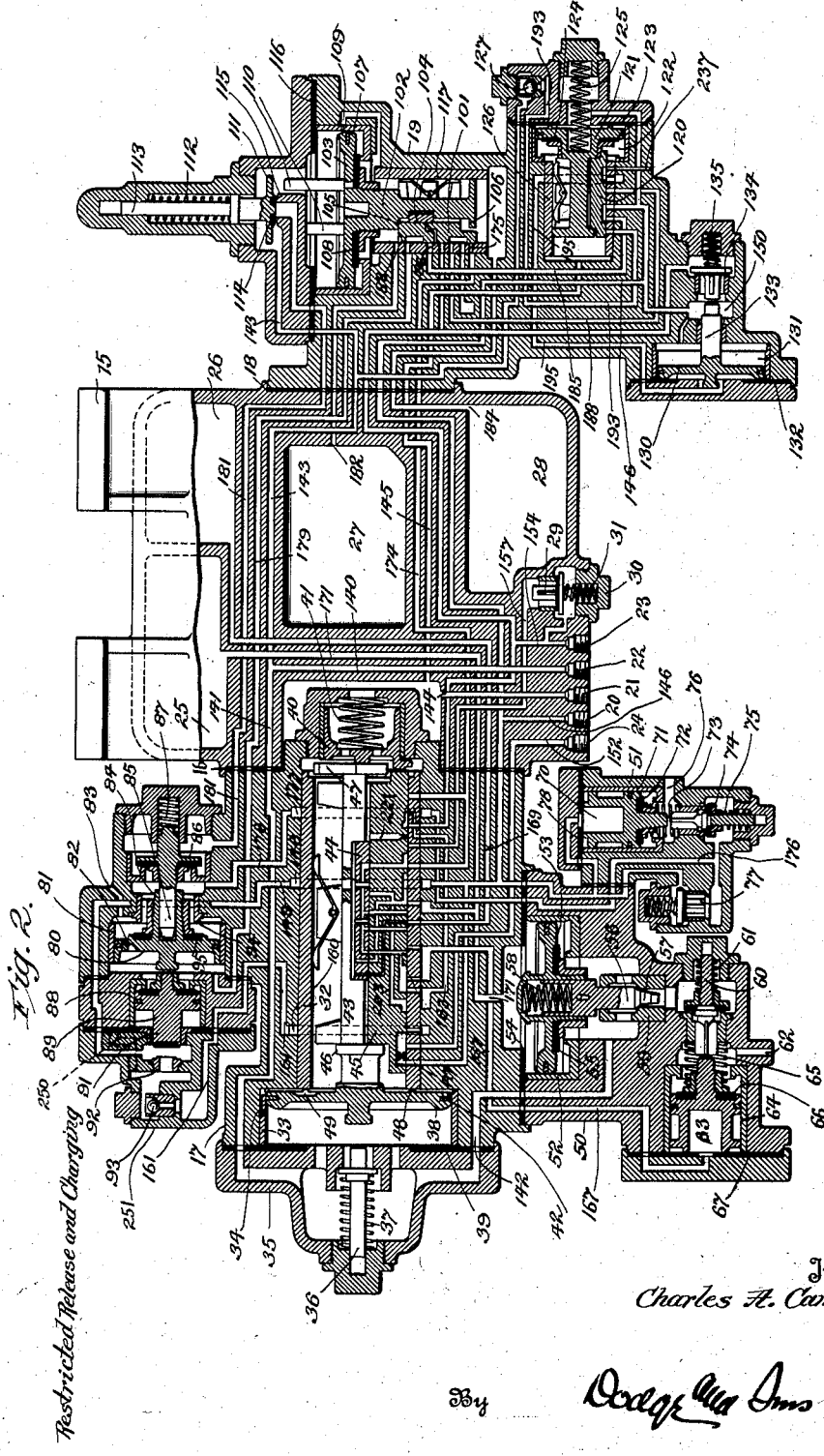
Fig. 2 is a similar view showing the parts in restricted release and recharge position.

*Restricted charging and restricted release, Fig. 2.*—If the rise of brake pipe pressure is rapid, as is the case in the forward portion of the train, the pressure to the left of the piston 38 will predominate decidedly over auxiliary reservoir pressure. The strength of the spring 41 is so chosen that it will yield when this predominance reaches a chosen value, assumed to be about 3 pounds per square inch. When the spring 41 is thus overpowered, the triple piston with its slide and graduating valves moves to the position shown in Fig. 2. This results in certain differences from release, and these differences will now be pointed out, it being understood that otherwise there is general conformity to the functions in normal release.

In this position the rib 48 seats against the end of bushing 32 and the charging rate is reduced because it is limited to the capacity of the narrow groove port 49. In this position of the slide valve the equalizing chamber is charged as before, but the reduction chamber 26, instead of being connected to atmosphere, is charged also by way of the ports 215, 214, 168 and passage 169. The capacity of port 216 is not restricted and chamber 26 charges to the same pressure as the auxiliary reservoir. The subsequent dissipation of this charge in normal release occurs at a relatively slow rate commensurate with the rate of dissipation of the overcharge in the auxiliary reservoir. It follows from this that the suspension of the quick service venting function conforms generally in duration with the duration of overcharge of the auxiliary reservoir.

Pressure in the emergency reservoir is slowly reduced, the flow occurring through the reservoir connection 23, passage 154, port 155, cavity 222, port 164, passage 163, to independent exhaust. It will be observed that the cavity 222 is formed with a constricted extension which throttles the exhaust flow from the emergency reservoir. As explained, the purpose of venting the emergency reservoir is two-fold: First, to dissipate the overcharge in the auxiliary reservoir when the valve returns to normal release position; and second, to counteract the effect of overcharged auxiliary reservoirs in emergency applications following immediately upon a release. Dissipation of the overcharge can be made to counter-act almost completely the tendency of brakes to reapply when the engineer shifts his brake valve to running position, after a full release manipulation.

It will be observed that exhaust from the brake cylinder takes place as before except that the shifting of the triple slide valve 45 has interposed the constriction 202 between cavities 200 and 201 in the path of the exhausting air. In this way the familiar function of retarded release is secured.

Obviously those chambers charged concurrently with the auxiliary reservoir and those spaces exhausted concurrently with the brake cylinder are charged or exhausted as the case may be at slower rates than in normal release and recharge position. Aside from this, and the special features above pointed out, the description of the functions in normal release applies to restricted release.

Figure 3:
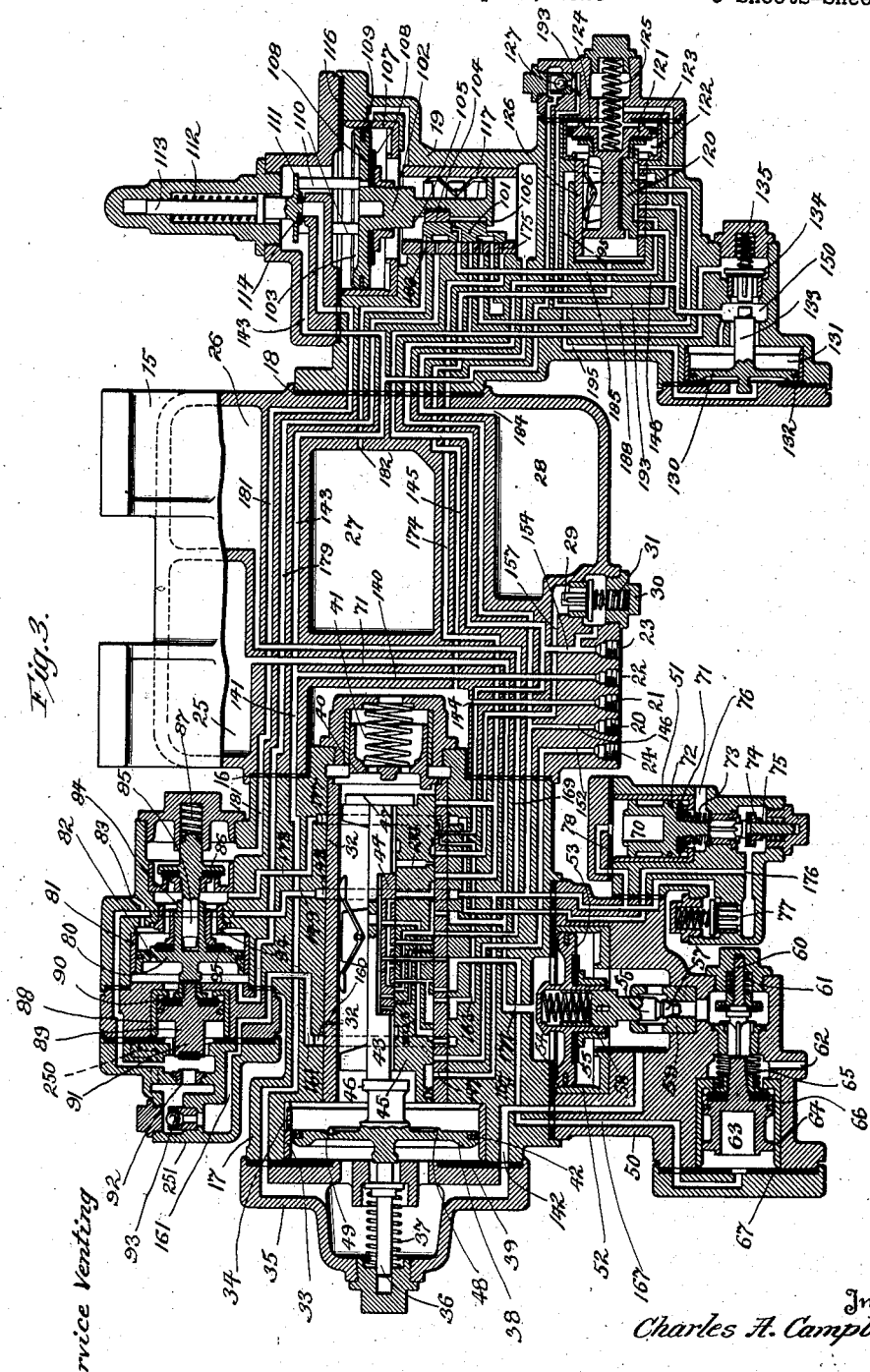
Fig. 3 is a similar view showing the parts in the position in which quick service venting occurs.

*Quick service, Fig. 3.*—Assuming the system to be charged, a moderate reduction in brake pipe pressure, which of course is communicated to the space within the front cap 35 at the left of the piston 38, causes the piston 38 to move to the left under the predominating auxiliary reservoir pressure. The graduating valve 44 moves first relatively to the slide valve 45 and then the two move together until the piston is arrested by the graduating stem 36 and its spring 37. Auxiliary reservoir air then flows through ports 212, 211, 166 and passage 167 to the space at the left of quick service exhaust opening piston 63. Piston 63 moves to the right against the opposition of spring 65 and seals by means of gasket 66. The effect is to unseat the quick service exhaust check 60. At the same time the cavity 217 in the slide valve 45 connects the ports 168 and 170. This connects the equalizing chamber 25 and the space above the quick service piston 53 with the reduction chamber 26.

After normal release the reduction chamber will be at atmospheric pressure and the volumes of the two chambers are so chosen that under these conditions a pressure drop commensurate with a service brake pipe reduction, assumed to be 7 pounds, occurs upon equalization. It follows from this that under these conditions the quick service piston 53 will rise, opening the valve 56, and when brake pipe pressure has been reduced 7 pounds, the piston will move downward and close valve 56.

Immediately after a restricted recharge sufficiently protracted to bring the reduction chamber to auxiliary reservoir pressure, it is obvious that piston 53 would, in quick service, be subject to auxiliary reservoir pressure and therefore could not rise and open the valve 56 at all.

There will also be intermediate cases occasioned by partial charging of the reduction chamber 26 or partial venting of this chamber after complete charging. In such cases the chambers 25 and 26 will equalize at pressures giving less than the maximum 7 pound reduction. In such cases the piston 53 will move upward and then downward again opening the valve 56 and thereafter closing it when the brake pipe pressure has been reduced by an amount less than the assumed 7 pounds maximum.

In this position of the triple valve auxiliary reservoir air flows to the brake cylinder as follows: ports 205, 203, 159 passages 160 and 161 past check valve 93, through valve seat 92, passages 149, 148, 146, to brake cylinder connection 20. If brake pipe pressure is reduced more rapidly than auxiliary reservoir pressure, graduating spring 37 will be overpowered, allowing the piston 38 and its connected valves 44 and 45 to assume full service position, which will be described with reference to Fig. 5. It is assumed, however, in the following description that this further movement does not occur.

It will be observed that the passage 146 is connected with the space above the piston 70 so that this piston is always subject to brake cylinder pressure. When a suitable pressure, assumed to be 15 pounds per square inch, is reached, piston 70 moves downward against the tension of spring 73 and unseats check valve 74. This valve has no function in service, but acts to divert brake pipe air to the atmosphere in emergency applications if the brake cylinder is charged to such pressure as would delay brake pipe emergency venting.

As the pressure in the brake pipe passage 140 is being reduced, the passage 143 serves to communicate this reduction to the space above the emergency control piston 103. This results in the upward movement of the piston 103, first with the graduating valve 104, and then with the emergency control slide valve 101. The parts are so arranged that the graduating valve 144 moves clear of the vent port 231 before the slide valve 101 moves. This motion continues until the piston 103 is arrested by the collision of the lugs 110 with the brake pipe emergency check 111. Spring 112 is of such strength that it is not overpowered. In this position port 231 in the slide valve 101 registers with the port 186. Air flows by way of passage 185, port 187, cavity 236, and passage 146 to the brake cylinder connection 20.

It will be observed that emergency actuation chamber 27 is in communication with the space within the bushing 117 by way of passage 182 and port 183, while the emergency control chamber 28 is in communication with the same space by means of passage 184. Consequently in this position these two chambers are concurrently vented to the brake cylinder and the rate of such venting is chosen so that it conforms closely to the rate of reduction of brake pipe pressure in the space above the emergency control piston 103.

The size of the port 231 and the strength of the spring 112 are so coordinated that if brake pipe pressure is reduced at a rate exceeding the normal service rate, piston 103 will be moved up by the predominating pressure within the valve bushing 117. This will cause the emergency control piston and valve to assume emergency position, hereinafter described. In the present description it will be assumed that brake pipe air is reduced at a normal rate and that the parts retain their illustrated positions.

It will be observed that the brake cylinder connection 20 and the passage 146 communicate to the space at the right of the change-over piston 121, thus subjecting this piston to brake cylinder pressure at the right. At the left it is subject to auxiliary reservoir pressure and the spring 25 is of such strength as to maintain only a moderate differential, assumed to be 5 pounds per square inch. Consequently in all ordinary service applications, as contradistinguished from full service applications, piston 121 stands to the right. Cavity 235 in change-over slide 120 connects the space to the left of the emergency reservoir by-pass piston 130 to atmosphere, the connection being by passage 195, port 194, recess 235, and port 237. The air from the brake cylinder passage 146 flows through chamber 150 to the space to the right of the piston 130 and forces this to the left, seating it against gasket 132.

Figure 4:
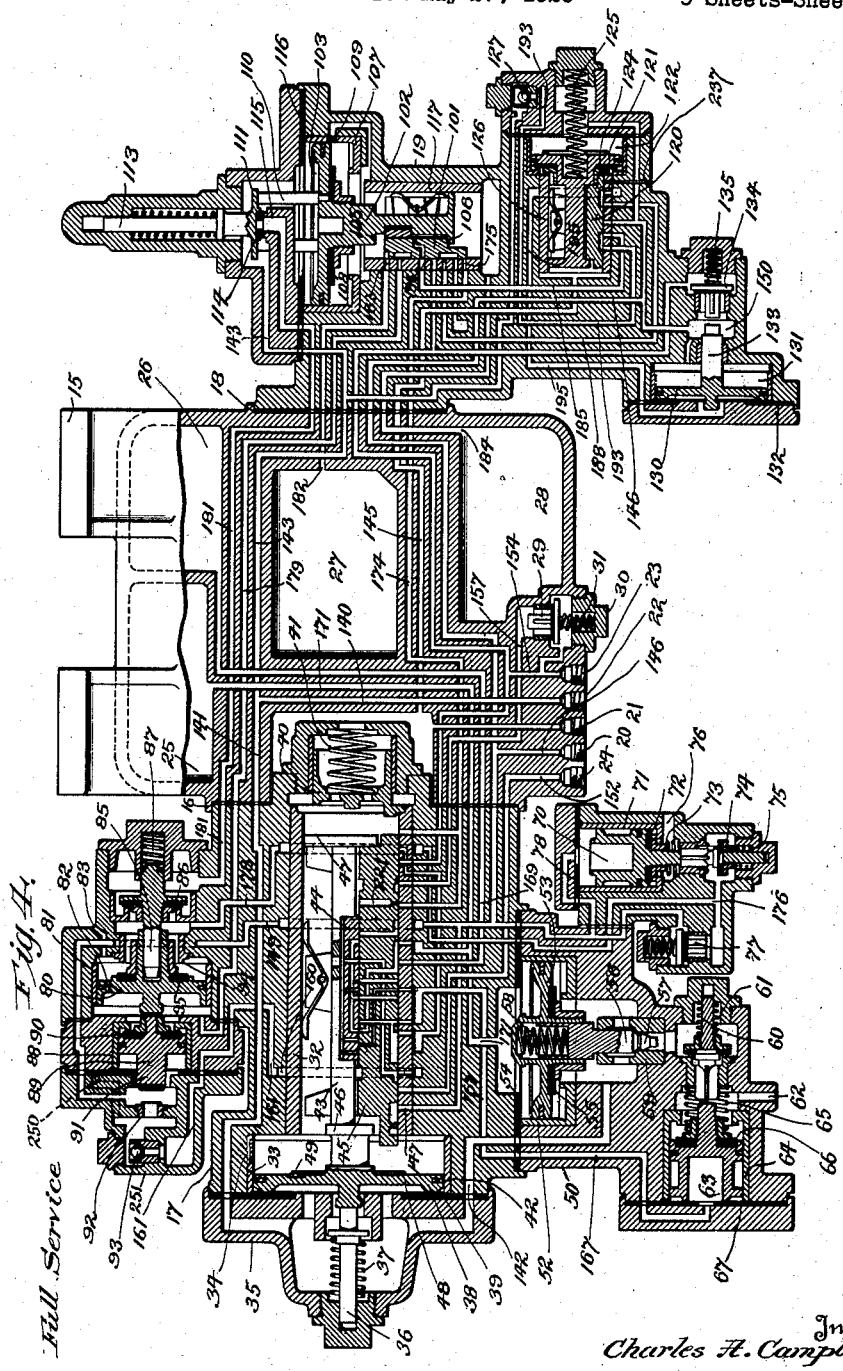
Fig. 4 is a similar view showing the parts in full service position.

*Full service position, Fig. 4.*—As has already been suggested, a sufficiently rapid and severe brake pipe reduction, yet one not severe enough to produce an emergency application, will cause the triple piston 38 to overpower the graduating spring 37 so that the piston moves to the left and seats on the gasket 39. In this position the chamber to the left of the quick service exhaust opening piston 63 is vented to atmosphere by way of passage 167, port 165, ports 207, 206 and 162. Thus the quick service exhaust check closes and prevents any local venting of the brake pipe, regardless of any opening of the valve 56 under the action of piston 53.

It follows from the above that if the service rate of brake pipe reduction be slightly exceeded, the quick service vent closes. The service port 203 in the slide valve 45 registers fully with the service port 160 and produces a rapid building up of brake cylinder pressure by air flowing from the auxiliary reservoir. It is obvious that the tension of the spring 37, the size of the port 203 and the rate of exhaust through the vent valve 56, 59 can be so coordinated that quick service venting will be terminated when the rate of brake pipe reduction approaches an emergency rate. In this way the utmost benefit possible from local service venting can be secured without danger that it will produce undesired emergency applications.

The operation of the emergency control piston 103 and associated parts will be substantially the same as that described under quick service until the brake cylinder pressure approaches auxiliary reservoir pressure within the differential, assumed to be 5 pounds, maintained by spring 125. At such time the spring 125 shifts the change-over piston 121 and its connected valve 120 to the left until gasket 124 seats and seals. In this position the air vented from the emergency actuation chamber 27 and the emergency control chamber 28 is diverted so that instead of flowing to the brake cylinder it flows to the brake pipe as follows: port 231, passage 186, port 187, recess 236, port 192, passage 193, check valve 127, brake pipe passages 143 and 140, to brake pipe connection 22. At the same time the space to the left of the piston 130 is maintained in communication with the atmosphere by way of passage 195, port 194, cavity 235, port 190, passage 188, port 189, cavity 232, and exhaust port 191.

Figure 5:
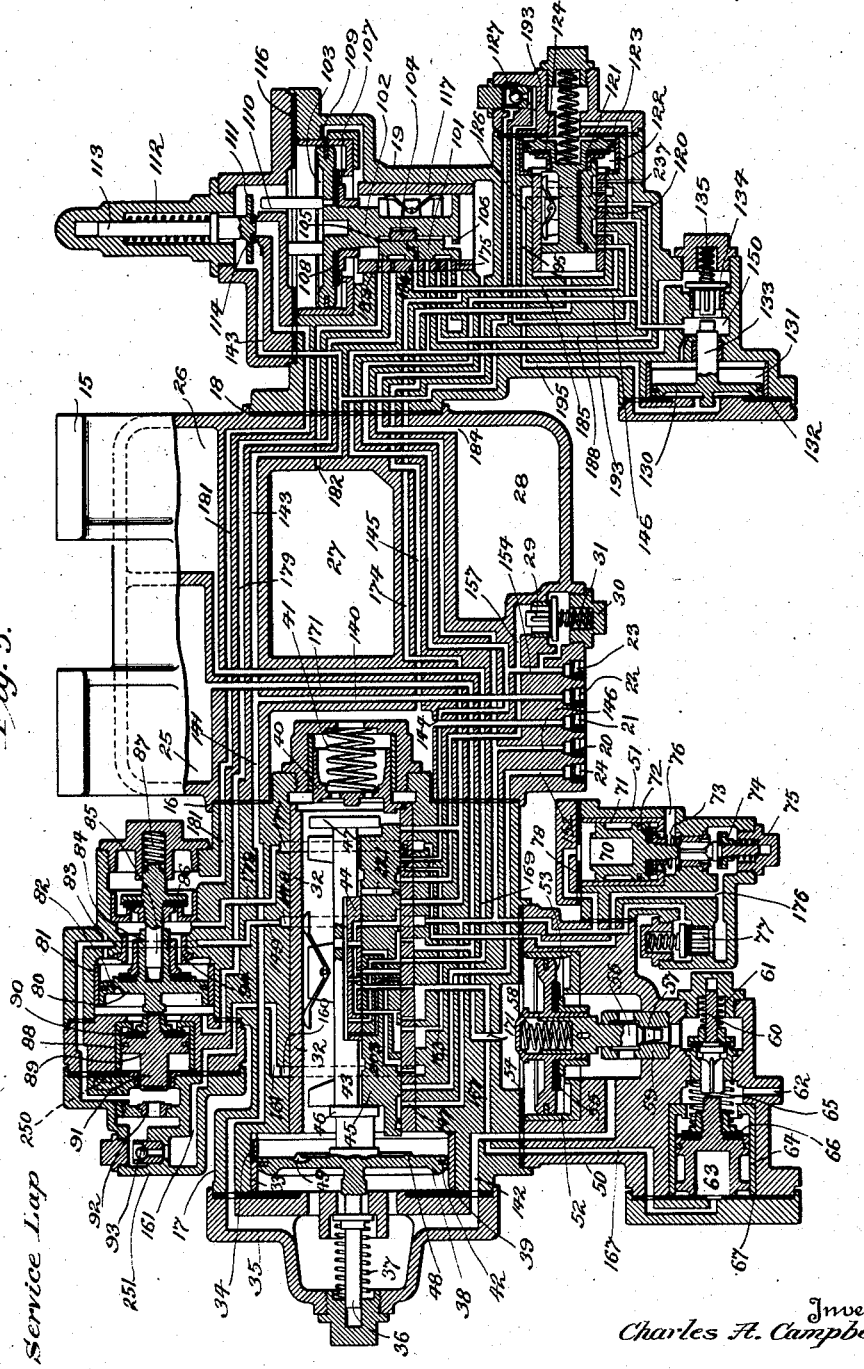
Fig. 5 is a similar view showing the parts in service lap position.

*Service lap position, Fig. 5.*—When the reduction of brake pipe pressure had stopped, the reduction of auxiliary reservoir pressure will continue by flow to the brake cylinder until the graduating spring 37 returns the piston 38, graduating valve 44 and slide valve 45 to the lap position. In this position port 205 is out of register with port 203, stopping the flow of air to the brake cylinder. Air is exhausted from the space at the left of the quick service opening piston 63 by way of passage 167, passage 166, ports 211, 213, 210, 207, 206, 162.

It will be observed that at each graduating movement of the main piston 38 the quick service opening piston 63 functions. Port 218 in the graduating valve registers with port 216, while cavity 217 bridges the ports 170 and 168, thereby allowing air from the equalizing chamber 25 and the reduction chamber 26 to equalize with auxiliary reservoir air. These thus become assisting volumes to the auxiliary reservoir until full equalization between the reservoir and brake cylinder is attained.

The emergency control piston 103 moves to a lap position in which the piston blanks the feed port 109 and in which the graduating valve 104 blanks the vent port 231. This position is defined by the collision of the shoulder 105 with the emergency control valve 101. The effect is to prevent further venting of the emergency actuation and emergency control chambers and to prevent back-flow of air from the space within the valve bushing 117 to the brake pipe.

Figure 6:
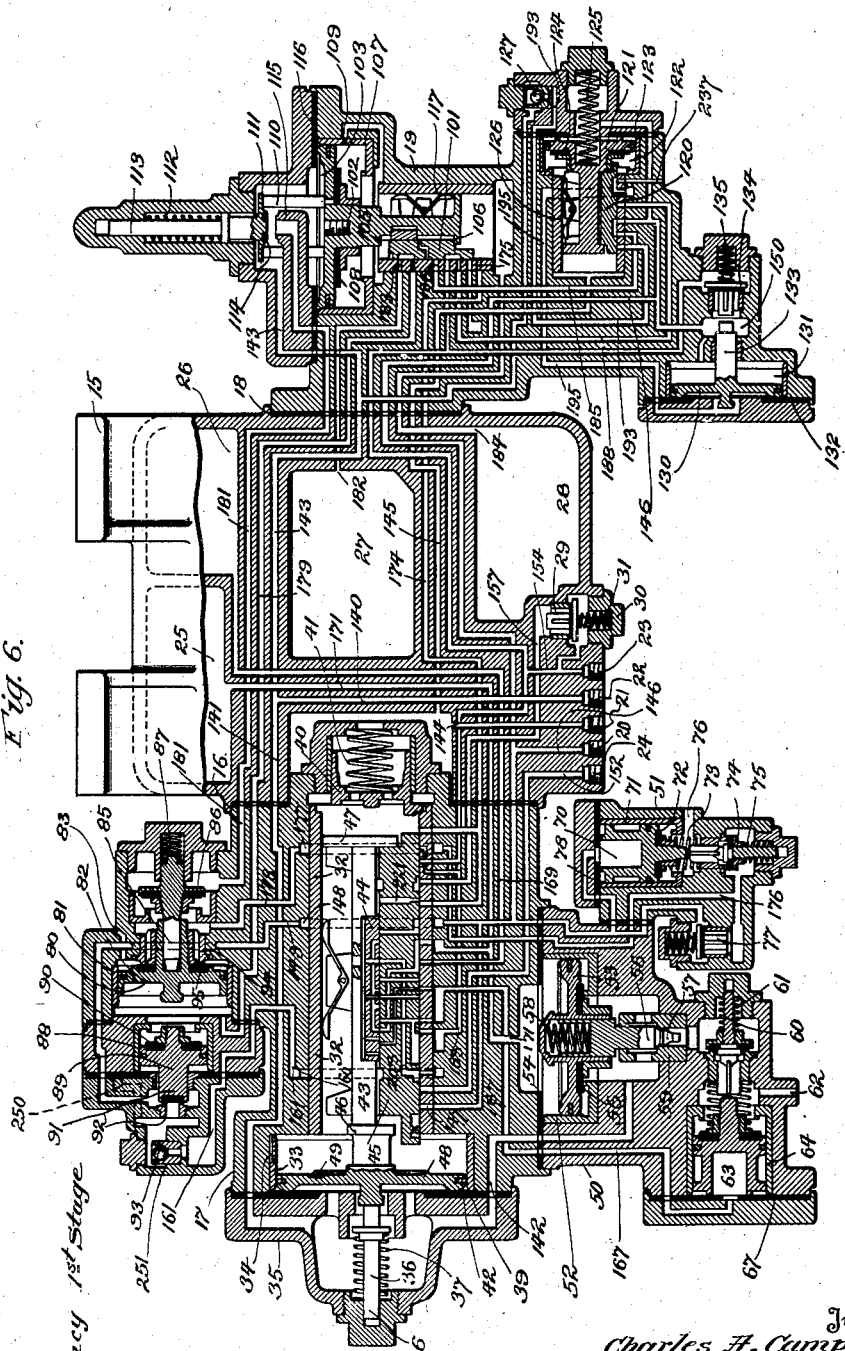
Fig. 6 is a similar view showing the parts in the position they assume in the first stage of emergency application.

*Emergency position, first stage, Fig. 6.*— If the reduction of brake pipe pressure be made suddenly either by the engineer's brake valve or from some other cause, the pressure above the emergency control piston 103 will be suddenly reduced so that this piston will be forced upward, overpowering spring 112 and causing piston 103 to seat on gasket 116. In this position the brake pipe emergency check 111 is unseated and allows brake pipe air to flow through passage 181 to the space at the right of check valve 86. The cavity 230 in emergency control valve 101 connects the emergency actuation chamber 27 by way of passage 182, port 183, recess 230, port 180, passage 179, to the space between the pistons 80 and 89.

The effect is to force the piston 80 to the right, until gasket 95 seals, unseating check valve 86 and allowing brake pipe air to flow past the check valve 86 and through passages 178, 177 and 176 to the space below the check valve 77. The check 77 opens and the air flows to passage 146 and hence to the brake cylinder connection 20.

As heretofore stated, the space above the piston 70 is constantly in communication with the passage 146 and when brake cylinder pressure builds up to the critical value, assumed to be 15 pounds, the piston 70 moves downward and opens check valve 74, venting the brake pipe passage 176 to atmosphere through the port 76. At such times the check 77 closes against out-flow of brake cylinder air.

At the same time that the piston 80 moves to the right, the piston 89 moves to the left and seats the valve member 91 against the valve seat 92.

The sudden reduction of brake pipe pressure necessarily causes the triple piston 38 to move to the left to its emergency position. Thus auxiliary reservoir air flows rapidly through port 205 in the graduating valve, port 203 in the slide valve, port 160, passage 161, check valve 93. Here flow is arrested by the closing of the valve member 91 on the seat 92.

The space to the left of the quick service opening piston 63 is vented to atmosphere as in full service application so that the quick service vent is closed.

Cavity 217 in the slide valve 45 connects the equalizing chamber and the reduction chamber with the space above the equalizing piston 53 and as the brake pipe pressure rapidly drops, the piston 53 moves down against the action of spring 58 and seals by means of gasket 55. This prevents any loss of air to the brake pipe past the piston 53.

From the action of the emergency by-pass piston 70 and the emergency build-up delay valve 91, it follows that so long as piston 89 remains in its left hand position, only 15 pounds pressure (the assumed critical value determined by spring 73) can be fed to the brake cylinder. Nevertheless there is no interference with the quick action feature by means of which the brake pipe is vented.

When the main slide valve 45 moves to its extreme left hand position, the port 173 is uncovered and allows auxiliary reservoir air to flow through the passage 174 to the port 175 in the seat of the emergency control valve 101. In the emergency position of the emergency control valve this port is uncovered so that communication between the auxiliary reservoir and the emergency control valve chamber is established.

Cavity 232 in the emergency control valve 101 allows emergency reservoir air to flow from connection 23 by way of passages 154, 156, recess 232, port 189, passage 188, to the port 190 in the seat of slide valve 120 which is at this time blanked, the change-over valve being in its right hand position.

In emergency actuation piston 80 there is a small port 82 which establishes communication through the piston to an exhaust port 83. The purpose of this port is to allow the emergency actuation chamber air to bleed away to atmosphere in a predetermined time, assumed to be 7 seconds. When the air in the space between the pistons 80 and 89 has been reduced in pressure below 15 pounds per square inch, the piston 89 moves to the right until it seals by means of the gasket 90. This initiates the second stage of emergency, which will be hereafter described.

Figure 7:
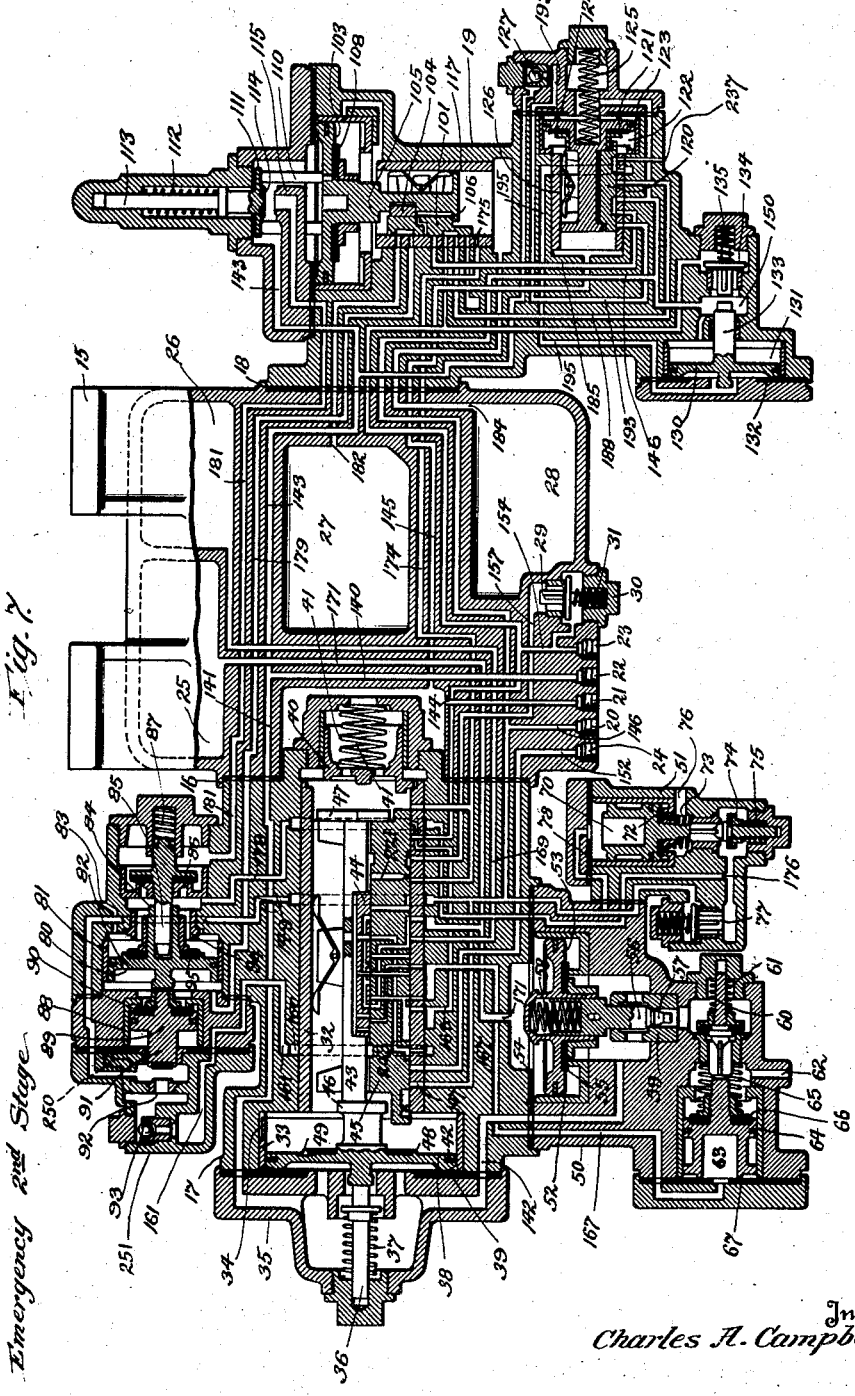
Fig. 7 is a similar view showing the parts in the position assumed in the second stage of emergency application.

*Emergency, second stage, Fig. 7.*—When piston 89 moves to the right, the valve 91 is unseated and auxiliary reservoir air rapidly flows to the brake cylinder, continuing from the check valve 93, to which its course has already been traced, through the seat 92, passages 149, 148, 146, to brake cylinder connection 20. By the time the auxiliary reservoir air is admitted, the 15 pound application brought about by brake pipe air will have caused the slack in the train to adjust itself. When the pressure between the pistons 80 and 89 is reduced to or near atmospheric pressure, the spring 87 seats the check valve 86. This terminates the flow of brake pipe air to atmosphere and conditions the apparatus for a subsequent release.

As the pressure in the brake cylinder connection 146 builds up, this pressure is communicated, as already described, to the space to the right of the change-over piston 121. At the same time the pressure on the left hand side of the change-over piston 121 will decrease, since this space is in direct communication with the auxiliary reservoir.

It being assumed that the spring 125 will maintain a differential of 5 pounds, it is obvious that when auxiliary reservoir pressure and brake cylinder pressure approach within the 5 pounds of equalization, the change-over piston 121 will be moved to the left by the spring 125, shifting the change-over valve 120 and initiating the final stage of emergency.

Figure 8:
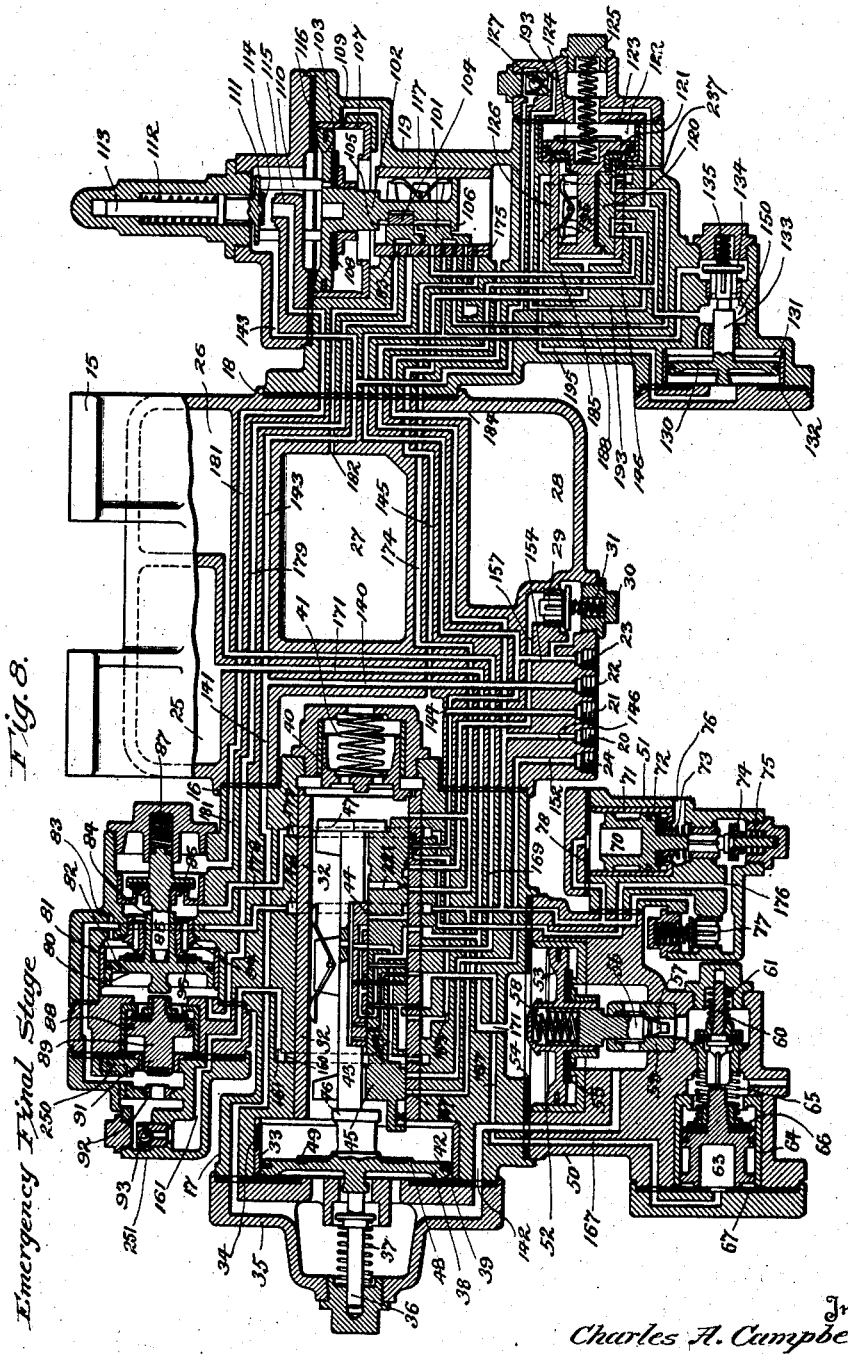
Fig. 8 is a similar view showing the parts in the position they assume in the third and final stage of emergency application.

*Emergency position, final stage, Fig. 8.*— The piston 121 moves to the left until the gasket 124 seals. In this position emergency reservoir air flows from connection 23 through passage 154, port 156, cavity 232, port 189, passage 188, port 190, cavity 235, port 194 and passage 195, to the space to the left of the emergency reservoir by-pass piston 130.

At this time there is brake cylinder pressure on the right hand side of this piston. It follows that the piston 130 will move to the right, unseating check valve 134 and thus allowing emergency reservoir air to flow to the brake cylinder as follows: connection 23, passage 154, check valve 134, chamber 150, passage 146 to connection 20.

This allows quick equalization between the emergency reservoir and the brake cylinder, but only after the brake cylinder pressure has risen to within the 5 pounds of equalization with the auxiliary reservoir. As the pressure in the brake cylinder connections is increased above that in the auxiliary reservoir, equalization with the auxiliary reservoir is prevented by the service port check 93. When the pressures on the opposite sides of the piston 130 approach equalization, the emergency reservoir by-pass check 134 will close.

*Release after emergency.*—If the triple piston 38 should move to release position before the emergency control piston 103 does so, the space within the bushing 177 and below the piston 103 is connected to atmosphere by way of port 175, passage 174, ports 172, 209, 208, 210, 207, 206 and 162. It follows from this that brake pipe pressure above the piston 103 will quickly predominate and shift the emergency control valve to release position.

*Provision for transition in changing to new equipment.*—If cars equipped with K—2 triples were coupled in trains with cars having the valve of the present application there would be surging because of the effect of build-up delay valve 91. For the transition period therefore, we provide a by-pass port 250, (shown dotted in Figs. 1 to 8) which may be caused to register with passage 149 and lead around valve 91 by turning cap 251 the space of one attaching bolt.

What is claimed is:

1. In a triple valve, the combination of a casing, a triple piston and slide valve of the type having a normal recharge position and an abnormal recharge position to which last the parts are moved by high releasing brake pipe pressure; connections for an auxiliary reservoir and a second and smaller closed chamber; and ports controlled by said slide valve arranged to connect said auxiliary reservoir and closed chamber connections in normal recharge position, and in abnormal recharge position to disconnect them and vent pressure fluid from said closed chamber.

2. In a triple valve, the combination of a casing, a triple piston and slide valve of the type having a normal recharge position and a restricted recharge position to which last the parts move upon high releasing brake pipe pressures; connections for an auxiliary reservoir and an emergency reservoir; a port connecting said connection opened by said slide valve in normal recharge and closed thereby in restricted recharge position; and a vent leading from said emergency reservoir connection and arranged to be opened by the movement of said slide valve to restricted recharge position.

3. An air brake triple valve comprising in combination a service mechanism controlling the flow of auxiliary reservoir air to the brake cylinder and exhaust from the brake cylinder; an emergency portion controlling the discharge of brake pipe air from the brake pipe; and means subject to brake cylinder pressure arranged to direct brake pipe air in emergency applications, to the brake cylinder while brake cylinder pressure is below a chosen value and to the atmosphere at other times.

4. An air brake triple valve comprising in combination a slide valve and actuating piston, controlling recharge, release, and the admission of auxiliary reservoir air to the brake cylinder in service and emergency applications; an independent emergency control device controlling the discharge of air from the brake pipe in emergency; and valve means subject to brake cylinder pressure and serving in emergency applications to direct the air discharged from the brake pipe by said emergency control device to the brake cylinder or to atmosphere according as brake cylinder pressure is below or above a chosen value.

5. An air brake triple valve comprising in combination a slide valve and actuating piston, controlling recharge, release, and the admission of auxiliary reservoir air to the brake cylinder in service and emergency applications; an independent emergency control device controlling the discharge of air from the brake pipe in emergency and including means for checking the flow of auxiliary reservoir air to the brake cylinder at the commencement of emergency applications; and valve means subject to brake cylinder pressure and serving in emergency applications to direct the air discharged from the brake pipe by said emergency control device to the brake cylinder or to atmosphere according as brake cylinder pressure is below or above a chosen value.

6. The combination of a triple slide valve and piston of the type characterized by restricted recharge under undue releasing pressure in the brake pipe, said valve having a brake pipe service vent and connections to auxiliary and emergency reservoirs; a pressure actuated valve controlling the service vent; a reservoir controlled as to charge by the movement of the triple slide valve to normal and restricted recharge position, and arranged so that its charge acts to close said pressure actuated valve and close the service vent when a service application follows restricted recharge; and ports controlled by the triple slide valve serving to connect the emergency and auxiliary connections together in normal recharge position and to isolate them and vent the emergency reservoir connection in restricted recharge.

7. A triple valve comprising in combination a casing; brake pipe, auxiliary reservoir and emergency reservoir connections thereto; a triple piston; a triple slide valve and associated graduating valve actuated by said triple piston to control the admission of auxiliary reservoir air to and exhaust from the brake cylinder, the piston and valve having a normal and a restricted release and recharge position; a brake pipe vent arranged to vent brake pipe air as the slide valve moves from release to service position; a resilient retard stop tending to arrest the triple piston and slide valve in normal recharge position, but permitting it to move under excessive releasing brake pipe pressure to restricted recharge position; a chamber charged concurrently with the auxiliary reservoir in both normal and restricted recharge positions; a second chamber so controlled by the triple slide valve that it is slowly vented to atmosphere in normal recharge position, and in restricted recharge position is charged concurrently with the auxiliary reservoir; a pressure actuated valve controlling said brake pipe vent and urged in opening direction by brake pipe pressure; means controlled by said triple slide valve serving as the valve moves toward service position to connect said chambers together and direct their equalized pressure against said pressure actuated valve in oposition to brake pipe pressure; and means controlled by said triple valve serving in normal recharge position to connect said auxiliary reservoir and emergency reservoir connections together, and in restricted recharge to isolate them and vent the emergency reservoir connection.

8. The combination of a triple valve including a slide valve adapted to admit air from an auxiliary reservoir to a brake cylinder in service and in emergency applications, and to release such air from the brake cylinder; an emergency valve mechanism operating upon the reduction of brake pipe pressure at an emergency rate to feed brake pipe air directly to the brake cylinder; and means subject to brake pipe pressure and serving, upon the attainment of a chosen pressure in the brake cylinder, to divert the brake pipe flow in emergency to the atmosphere.

9. The combination with a triple valve adapted to direct air from the auxiliary reservoir to the brake cylinder in emergency applications upon an emergency reduction of brake pipe pressure, of a secondary mechanism constructed and arranged to be independently actuated by said reduction of brake pipe pressure and when actuated serving to admit brake pipe air to the brake cylinder for a limited time period, and during such period of flow to the brake cylinder to obstruct the flow of auxiliary reservoir air through said triple valve to the brake cylinder; and a change-over mechanism controlled by the differential of pressure between auxiliary reservoir and brake cylinder and serving in emergency applications upon approach to equalization to admit air from a third source to said brake cylinder.

10. The combination with a triple valve adapted to direct air from the auxiliary reservoir to the brake cylinder in emergency applications upon an emergency reduction of brake pipe pressure, of a secondary mechanism constructed and arranged to be independently actuated by said reduction of brake pipe pressure and when actuated serving to admit brake pipe air to the brake cylinder for a limited time period, and during such period of flow to the brake cylinder to obstruct the flow of auxiliary reservoir air through said triple valve to the brake cylinder; means controlled by brake cylinder pressure serving in emergency applications to divert brake pipe flow to the atmosphere instead of to the brake cylinder when brake cylinder pressure attains a chosen value; and a change-over mechanism controlled by the differential of pressure between auxiliary reservoir and brake cylinder and serving in emergency applications upon approach to equalization to admit air from a third source to said brake cylinder.

11. The combination with a triple valve adapted to direct air from the auxiliary reservoir to the brake cylinder in emergency applications upon an emergency reduction of brake pipe pressure, of a secondary mechanism constructed and arranged to be independently actuated by said reduction of brake pipe pressure and when actuated serving to admit brake pipe air to the brake cylinder for a limited time period, and during such period of flow to the brake cylinder to obstruct the flow of auxiliary reservoir air through said triple valve to the brake cylinder; a change-over mechanism controlled by the differential of pressure between auxiliary reservoir and brake cylinder and serving in emergency applications upon approach to equalization to admit air from a third source to said brake cylinder; and valve means including a check valve for preventing flow from said third source to the auxiliary reservoir.

12. The combination with a triple valve adapted to direct air from the auxiliary reservoir to the brake cylinder in emergency applications upon an emergency reduction of brake pipe pressure, of a secondary mechanism constructed and arranged to be independently actuated by said reduction of brake pipe pressure and when actuated serving to admit brake pipe air to the brake cylinder for a limited time period, and during such period of flow to the brake cylinder to obstruct the flow of auxiliary reservoir air through said triple valve to the brake cylinder; means controlled by brake cylinder pressure serving in emergency applications to direct brake pipe flow to the atmosphere instead of to the brake cylinder when brake cylinder pressure attains a chosen value; a change-over mechanism controlled by the differential of pressure between auxiliary reservoir and brake cylinder and serving in emergency applications upon approach to equalization to admit air from a third source to said brake cylinder; and valve means including a check valve for preventing flow from said third source to the auxiliary reservoir.

13. The combination with a triple valve adapted to direct air from the auxiliary reservoir to the brake cylinder in service and emergency applications under the control of brake pipe pressure, of a secondary mechanism controlled by brake pipe pressure and serving in emergency applications to admit brake pipe air to the brake cylinder for a limited time period, and during such period of flow to the brake cylinder serving to obstruct the flow of auxiliary reservoir air through said triple valve to the brake cylinder; means associated with said second mechanism and operating during a service application to shorten the time period of brake pipe flow in emergency applications starting after a service application according to the intensity of such service application; and a change-over mechanism controlled by the differential of pressure between the auxiliary reservoir and brake cylinder and serving in emergency applications upon approach to equalization to admit air from a third source to said brake cylinder.

14. The combination with a triple valve adapted to direct air from the auxiliary reservoir to the brake cylinder in service and emergency applications under the control of brake pipe pressure, of a secondary mechanism controlled by brake pipe pressure and serving in emergency applications to admit brake pipe air to the brake cylinder for a limited time period, and during such period of flow to the brake cylinder serving to obstruct the flow of auxiliary reservoir air through said triple valve to the brake cylinder; means associated with said second mechanism and operating during a service application to shorten the time period of brake pipe flow in emergency applications starting after a service application according to the intensity of such service application; means controlled by brake cylinder pressure serving in emergency applications to direct brake pipe flow to the atmosphere instead of to the brake cylinder when brake cylinder pressure attains a chosen value; and a change-over mechanism controlled by the differential of pressure between the auxiliary reservoir and brake cylinder and serving in emergency applications upon approach to equalization to admit air from a third source to said brake cylinder.

15. The combination with a triple valve adapted to direct air from the auxiliary reservoir to the brake cylinder in service and emergency applications under the control of brake pipe pressure, of a secondary mechanism controlled by brake pipe pressure and serving in emergency applications to admit brake pipe air to the brake cylinder for a limited time period, and during such period of flow to the brake cylinder serving to obstruct the flow of auxiliary reservoir air through said triple valve to the brake cylinder; means associated with said second mechanism and operating during a service application to shorten the time period of brake pipe flow in emergency applications starting after a service application according to the intensity of such service application; a change-over mechanism controlled by the differential of pressure between the auxiliary reservoir and brake cylinder and serving in emergency applications upon approach to equalization to admit air from a third source to said brake cylinder; and valve means including a check valve serving to prevent flow from said third source to the auxiliary reservoir.

16. The combination with a triple valve adapted to direct air from the auxiliary reservoir to the brake cylinder in service and emergency applications under the control of brake pipe pressure, of a secondary mechanism controlled by brake pipe pressure and serving in emergency applications to admit brake pipe air to the brake cylinder for a limited time period, and during such period of flow to the brake cylinder serving to obstruct the flow of auxiliary reservoir air through said triple valve to the brake cylinder; means associated with said second mechanism and operating during a service application to shorten the time period of brake pipe flow in emergency applications starting after a service application according to the intensity of such service application; means controlled by brake cylinder pressure serving in emergency applications to direct brake pipe flow to the atmosphere instead of to the brake cylinder when brake cylinder pressure attains a chosen value; a change-over mechanism controlled by the differential of pressure between the auxiliary reservoir and brake cylinder and serving in emergency applications upon approach to equalization to admit air from a third source to said brake cylinder; and valve means including a check valve serving to prevent flow from said third source to the auxiliary reservoir.

17. The combination with a triple valve having a piston actuated slide valve controlling the admission of auxiliary reservoir air to the brake cylinder and the release of air from the brake cylinder, of a piston actuated valve controlling the flow of brake pipe air to the brake cylinder, arranged to be opened by pressure, and having a restricted port for bleeding such pressure down to cause the valve to close; an emergency actuation chamber charged in the release and recharge position; an emergency control chamber charged in release and recharge position; a piston controlling the charging of said chambers and itself actuated by brake pipe pressure and control chamber pressure in opposition to each other; a valve actuated by the last named piston and serving on reduction of brake pipe pressure at service rate to vent the control chamber and reduce its pressure at a similar rate, and serving upon a sudden reduction of brake pipe pressure to admit pressure fluid from the emergency actuation chamber to act on said piston actuated valve; and a change-over valve subject to the differential of pressure between brake cylinder and auxiliary reservoir controlling the vent from the control chamber and serving in service when there is a substantial differential to direct flow to the brake cylinder, and when equalization is approached to direct flow to the brake pipe.

18. The combination with a triple valve having a piston actuated slide valve controlling the admission of auxiliary reservoir air to the brake cylinder and the release of air from the brake cylinder, of a piston actuated valve controlling the flow of brake pipe air to the brake cylinder, arranged to be opened by pressure, and having a restricted port for bleeding such pressure down to cause the valve to close; an emergency actuation chamber charged in the release and recharge position; an emergency control chamber charged in release and recharge position; a piston controlling the charging of said chambers and itself actuated by brake pipe pressure and control chamber pressure in opposition to each other; a valve actuated by the last named piston and serving on reduction of brake pipe pressure at service rate to vent the control chamber and emergency actuation chamber and reduce their pressures at a similar rate, and serving upon a sudden reduction of brake pipe pressure to admit pressure fluid from the emergency actuation chamber to act on said piston actuated valve; and a change-over valve subject to the differential of pressure between brake cylinder and auxiliary reservoir controlling the vent from the control chamber and emergency actuation chamber, and serving in service when there is a substantial differential to direct flow to the brake cylinder, and when equalization is approached to direct flow to the brake pipe.

19. The combination with a triple valve having a piston actuated slide valve controlling the admission of auxiliary reservoir air to the brake cylinder in service and in emergency applications and the release of air from the brake cylinder, of a pressure actuated valve mechanism controlling the flow of brake pipe air to the brake cylinder and the flow of auxiliary reservoir air to the brake cylinder, said valve mechanism being arranged to shift under pressure to start brake pipe flow to the brake cylinder and obstruct auxiliary reservoir flow, and having a bleed port to relieve such pressure and cause said valve to shift to cut off brake pipe and free auxiliary reservoir flow after a time interval; an emergency actuation chamber charged in the release and recharge position; an emergency control chamber charged in the release and recharge position; a piston controlling the recharge of said chambers and itself actuated by brake pipe pressure and control chamber pressure in opposition to each other; a valve actuated by the last named piston and serving on reduction of brake pipe pressure at service rate to vent pressure from said chambers at a service rate and serving upon a sudden reduction of brake pipe pressure to admit pressure fluid from the emergency actuation chamber to act upon said pressure actuated valve mechanism; and a change-over valve mechanism subject to the differential of pressure between the auxiliary reservoir and brake cylinder arranged to shift when equalization of pressures is approached and serving when shifted in service applications to divert flow of air from the two chambers from the brake cylinder to the brake pipe.

20. The combination with a triple valve having a piston actuated slide valve controlling the admission of auxiliary reservoir air to the brake cylinder in service and in emergency applications and the release of air from the brake cylinder, of a pressure actuated valve mechanism controlling the flow of brake pipe air to the brake cylinder, and the flow of auxiliary reservoir air to the brake cylinder, said valve mechanism being arranged to shift under pressure to start brake pipe flow to the brake cylinder and obstruct auxiliary reservoir flow, and having a bleed port to relieve such pressure and cause said valve to shift to cut off brake pipe and free auxiliary reservoir flow after a time interval; an emergency actuation chamber charged in the release and recharge position; an emergency control chamber charged in the release and recharge position; a piston controlling the recharge of said chambers and itself actuated by brake pipe pressure and control chamber pressure in opposition to each other; a valve actuated by the last named piston and serving on reduction of brake pipe pressure at service rate to vent pressure from said chambers at a service rate and serving upon a sudden reduction of brake pipe pressure to admit pressure fluid from the emergency actuation chamber to act upon said pressure actuated valve mechanism; and a change-over valve mechanism subject to the differential of pressure between the auxiliary reservoir and brake cylinder arranged to shift when equalization of pressures is approached and serving when shifted in emergency applications to admit air from a third source to the brake cylinder.

21. The combination with a triple valve having a piston actuated slide valve controlling the admission of auxiliary reservoir air to the brake cylinder in service and in emergency applications and the release of air from the brake cylinder, of a pressure actuated valve mechanism controlling the flow of brake pipe air to the brake cylinder and the flow of auxiliary reservoir air to the brake cylinder, said valve mechanism being arranged to shift under pressure to start brake pipe flow to the brake cylinder and obstruct auxiliary reservoir flow, and having a bleed port to relieve such pressure and cause said valve to shift to cut off brake pipe and free auxiliary reservoir flow after a time interval; an emergency actuation chamber charged in the release and recharge position; an emergency control chamber charged in the release and recharge position; a piston controlling the recharge of said chambers and itself actuated by brake pipe pressure and control chamber pressure in opposition to each other; a valve actuated by the last named piston and serving on reduction of brake pipe pressure at service rate to vent pressure from said chambers at a service rate and serving upon a sudden reduction of brake pipe pressure to admit pressure fluid from the emergency actuation chamber to act upon said pressure actuated valve mechanism; and a change-over valve mechanism subject to the differential of pressure between the auxiliary reservoir and brake cylinder arranged to shift when equalization of pressures is approached and serving when shifted in service applications to divert flow of air from the two chambers from the brake cylinder to the brake pipe, and when shifted in emergency applications to admit air from a third source to the brake cylinder.

22. The combination with a triple valve adapted to direct air from the auxiliary reservoir to the brake cylinder in emergency applications upon a severe reduction of brake pipe pressure, of a secondary mechanism constructed and arranged to be actuated by said reduction of brake pipe pressure and when actuated serving to admit brake pipe air to the brake cylinder for a limited time period, and during such period serving to obstruct the flow of auxiliary reservoir air through said triple valve to the brake cylinder.

23. The combination with a triple valve adapted to direct air from the auxiliary reservoir to the brake cylinder in service and in emergency applications under the control of brake pipe pressure, of a secondary mechanism controlled by brake pipe pressure and serving in emergency applications to admit brake pipe air to the brake cylinder for a limited time period, and during said period serving to obstruct the flow of auxiliary reservoir air through said triple valve to the brake cylinder; and means associated with said secondary mechanism and operating during a service application to shorten the time period of brake pipe flow in an emergency application starting during a service application, according to the intensity of such service application.

24. The combination with a triple valve adapted to direct air from the auxiliary reservoir to the brake cylinder through a service port in service and in emergency applications, of means serving to admit brake pipe air to the brake cylinder at the commencement of an emergency application; and a secondary mechanism controlled by brake pipe pressure and serving in emergency applications to obstruct said service port for a limited time period.

25. The combination with a triple valve adapted to direct air from the auxiliary reservoir to the brake cylinder in service and in emergency applications, of means serving to admit brake pipe air to the brake cylinder at the commencement of an emergency application; a secondary mechanism controlled by brake pipe pressure and serving in emergency applications to obstruct for a limited time period the flow of auxiliary reservoir air through the triple valve to the brake cylinder; and means associated with said secondary mechanism and operating during a service operation to shorten the time period of such obstruction in an emergency application starting during a service application, according to the intensity of such service application.

26. The combination with a triple valve having a slide valve controlling the admission of auxiliary reservoir air to the brake cylinder and its exhaust therefrom, of a piston-actuated valve controlling the flow of brake pipe air to the brake cylinder, arranged to be opened by pressure, and having a restricted port for bleeding such pressure down to cause the valve to close; an emergency actuation chamber charged with pressure in release and recharge position of the triple valve; an emergency control chamber; a piston operated by brake pipe pressure and emergency control chamber pressure in opposition to each other; and a valve controlled by said piston and shifted by the piston upon a sudden reduction of brake pipe pressure to admit pressure fluid from the emergency actuation chamber to act upon said piston-actuated valve.

27. The combination with a triple valve having a slide valve controlling the admission of auxiliary reservoir air to the brake cylinder and its exhaust therefrom, of a piston-actuated valve mechanism having a port arranged to bleed down the pressure actuating the valve, said valve mechanism being moved by pressure so that it admits brake pipe pressure to the brake cylinder and obstructs the flow of auxiliary reservoir air through the slide valve to the brake cylinder; an emergency actuation chamber charged with pressure in release and recharge position of the triple valve; an emergency control chamber; a piston operated by brake pipe pressure and emergency control chamber pressure in opposition to each other; and a valve controlled by said piston and shifted by the piston upon a sudden reduction of brake pipe pressure to admit pressure fluid from the emergency actuation chamber to act upon said piston-actuated valve.

28. The combination with a triple valve having a piston-actuated slide valve controlling the admission of auxiliary reservoir air to the brake cylinder and its release therefrom of a piston-actuated valve controlling the flow of brake pipe air to the brake cylinder, arranged to be opened by pressure, and having a restricted port for bleeding such pressure down to cause the valve to close; an emergency actuation chamber charged with pressure in the release and recharge position of the triple valve; an emergency control chamber; a piston controlling the charging of said control chamber and itself operated by brake pipe pressure and control chamber pressure in opposition to each other; and a valve actuated by said piston and serving on a reduction of brake pipe pressure at a service rate to bleed the control chamber pressure down at a similar rate and serving upon a sudden reduction of brake pipe pressure to admit pressure fluid from the emergency actuation chamber to act upon said piston-actuated valve.

29. The combination with a triple valve having a piston-actuated slide valve controlling the admission of auxiliary reservoir air to the brake cylinder and its release therefrom of a piston-actuated valve mechanism having a port arranged to bleed down the actuating pressure, said mechanism being moved by pressure so that it admits brake pipe pressure to the brake cylinder and obstructs the flow of auxiliary reservoir air through said slide valve to the brake cylinder; an emergency actuation chamber charged with pressure in the release and recharge position of the triple valve; an emergency control chamber; a piston controlling the charging of said control chamber and itself operated by brake pipe pressure and control chamber pressure in opposition to each other; and a valve actuated by said piston and serving on a reduction of brake pipe pressure at a service rate to bleed the control chamber pressure down at a similar rate and serving upon a sudden reduction of brake pipe pressure to admit pressure fluid from the emergency actuation chamber to act upon said piston-actuated valve.

30. The combination with a triple valve having a piston-actuated slide valve controlling the admission of auxiliary reservoir air to the brake cylinder and its release therefrom of a piston-actuated valve controlling the flow of brake pipe air to the brake cylinder, arranged to be opened by pressure, and having a restricted port for bleeding such pressure down to cause the valve to close; an emergency actuation chamber charged with pressure in the release and recharge position of the triple valve; an emergency control chamber; a piston controlling the charging of said control chamber and itself operated by brake pipe pressure and control chamber pressure in opposition to each other; and a valve actuated by said piston and serving on a reduction of brake pipe pressure at a service rate to bleed both the control chamber pressure and the emergency actuation chamber pressure down at such service rate and serving upon a sudden reduction of brake pipe pressure to admit pressure fluid from the emergency actuation chamber to act upon said piston-actuated valve.

31. The combination with a triple valve having a piston-actuated slide valve controlling the admission of auxiliary reservoir air to the brake cylinder and its release therefrom of a piston-actuated valve mechanism having a port arranged to bleed down the actuating pressure, said mechanism being moved by pressure so that it admits brake pipe pressure to the brake cylinder and obstructs the flow of auxiliary reservoir air through said slide valve to the brake cylinder; an emergency actuation chamber charged with pressure in the release and recharge position of the triple valve; an emergency control chamber; a piston controlling the charging of said control chamber and itself operated by brake pipe pressure and control chamber pressure in opposition to each other; and a valve actuated by said piston and serving on a reduction of brake pipe pressure at a service rate to bleed both the control chamber pressure and the emergency actuation chamber pressure down at such service rate and serving upon a sudden reduction of brake pipe pressure to admit pressure fluid from the emergency actuation chamber to act upon said piston-actuated valve.

32. The combination with a triple valve having recharge, release and service application functions, of means for effecting an emergency application, and a device actuated by brake pipe pressure and comprising a control chamber; a piston subject to the pressure in said chamber on one side and to brake pipe pressure on the other; a feed port leading from the brake pipe to said control chamber, and so controlled by said piston that it is open under release conditions; a spring-sustained graduating stem arranged to arrest said piston under service reduction of brake pipe pressure and to yield to permit further travel of said piston under emergency reductions of brake pipe pressure; and a slide valve ported to vent said control chamber at a rate commensurate with a service reduction of brake pipe pressure when the piston is arrested by said graduating stem, and to admit pressure fluid to said emergency application effecting means to actuate the latter when said piston overpowers said stem.

33. The combination of a triple valve including a slide valve adapted to admit air from an auxiliary reservoir to a brake cylinder in service and emergency applications and to release such air from the brake cylinder; and an emergency valve mechanism operating in emergency to feed brake pipe air directly to the brake cylinder without communication to said slide valve.

34. The combination of a triple valve including a slide valve adapted to admit air from an auxiliary reservoir to a brake cylinder in service and in emergency applications and to release such air from the brake cylinder; and an emergency valve mechanism operating in emergency to admit brake pipe air to the brake cylinder and during such flow serving to close communication between the brake cylinder and said slide valve.

35. In a pneumatic brake system, the combination of a brake pipe; an auxiliary reservoir; an additional reservoir; a triple piston subject on one side to brake pipe pressure and on the other to auxiliary reservoir pressure; a triple slide valve actuated by said piston; a yielding retard stop tending to arrest said piston and valve in normal recharge position; and means controlled by over travel of said piston and valve against the resistance of said retard stop, and serving to restrict the flow of air to the auxiliary reservoir and suspend the flow of air to the additional reservoir.

36. In a pneumatic brake system, the combination of a brake pipe; an auxiliary reservoir; an additional reservoir; a triple valve chamber in constant communication with the auxiliary reservoir and having a valve seat provided with a feed port leading to said additional reservoir; a triple cylinder having a charging groove; a triple piston in said cylinder subject to opposing brake pipe and auxiliary reservoir pressures and adapted to permit charging through said groove in release positions; a yielding retard stop tending to arrest said piston in normal release position without yielding; means serving to restrict flow through said charging groove when said retard stop yields; and a triple slide valve on said seat, arranged to blank said feed port only when said retard stop is overpowered.

37. In a pneumatic brake system, the combination of a brake pipe; an auxiliary reservoir; an additional reservoir; a triple valve chamber in constant communication with the auxiliary reservoir and having a valve seat provided with a feed port leading to said additional reservoir; a check valve in said port arranged to prevent back flow from the reservoir to said seat; a triple cylinder having a charging groove; a triple piston in said cylinder subject to opposing brake pipe and auxiliary reservoir pressures and adapted to permit charging through said groove in release positions; a yielding retard stop tending to arrest said piston in normal release position without yielding; means serving to restrict flow through said charging groove when said retard stop yields; and a triple slide valve on said seat, arranged to blank said feed port only when said retard stop is overpowered.

In testimony whereof I have signed my name to this specification.

CHARLES A. CAMPBELL.